(12) United States Patent
Chow et al.

(10) Patent No.: US 10,246,343 B2
(45) Date of Patent: Apr. 2, 2019

(54) PROCESSING OF COBALTOUS SULPHA/DITHIONATE LIQUORS DERIVED FROM COBALT RESOURCE

(71) Applicant: ROCHER MANGANESE, INC., Phoenix, AZ (US)

(72) Inventors: Norman Chow, Vancouver (CA); Joey Chung-Yen Jung, Vancouver (CA); Anca Mihaela Nacu, Vancouver (CA); Douglas Dale Warkentin, Burnaby (CA)

(73) Assignee: Rocher Manganese, Inc., Phoenix, AZ (US)

( * ) Notice: Subject to any disclaimer, the term of this patent is extended or adjusted under 35 U.S.C. 154(b) by 0 days.

(21) Appl. No.: 15/806,183

(22) Filed: Nov. 7, 2017

(65) Prior Publication Data

US 2018/0155208 A1 Jun. 7, 2018

Related U.S. Application Data

(60) Provisional application No. 62/421,139, filed on Nov. 11, 2016.

(51) Int. Cl.
| | | |
|---|---|---|
| C01G 51/06 | (2006.01) |
| C01B 17/64 | (2006.01) |
| C01G 51/04 | (2006.01) |
| C01G 51/00 | (2006.01) |
| C01G 53/00 | (2006.01) |
| C01D 5/00 | (2006.01) |
| C01D 5/18 | (2006.01) |
| C01D 15/08 | (2006.01) |
| C02F 103/34 | (2006.01) |
| H01M 4/02 | (2006.01) |
| H01M 10/052 | (2010.01) |

(52) U.S. Cl.
CPC ............ *C01G 51/06* (2013.01); *C01B 17/64* (2013.01); *C01D 5/00* (2013.01); *C01D 5/18* (2013.01); *C01D 15/08* (2013.01); *C01G 51/04* (2013.01); *C01G 51/42* (2013.01); *C01G 53/006* (2013.01); *C02F 2103/34* (2013.01); *H01M 10/052* (2013.01); *H01M 2004/028* (2013.01)

(58) Field of Classification Search
CPC ........ C01G 51/06; C01G 45/00; C01G 45/02; C01G 53/04; C01G 53/06; C01B 17/64; H01M 10/052; C01F 7/001; C01F 7/02
See application file for complete search history.

(56) References Cited

U.S. PATENT DOCUMENTS

| | | |
|---|---|---|
| 3,994,716 A | 11/1976 | Huppmann et al. |
| 6,261,712 B1 | 7/2001 | Hayashi et al. |
| 6,514,311 B1 | 2/2003 | Lin et al. |
| 8,460,631 B2 | 6/2013 | Chow et al. |
| 9,074,265 B2 | 7/2015 | Harrison et al. |
| 2008/0050295 A1 | 2/2008 | Uchida et al. |

*Primary Examiner* — Steven J Bos
(74) *Attorney, Agent, or Firm* — Clark A. Puntigam; Jensen & Puntigam P.S.

(57) ABSTRACT

A process for water removal and/or recycling of sodium sulfate and/or sodium dithionate containing liquors derived from processing cobalt resource material essentially free of lithium comprising the steps of precipitation of cobalt as cobaltous carbonate or cobaltous hydroxide followed by removal thereof from the liquor, crystallization of sodium sulfate and sodium dithionate and removal of the crystals, followed by heating of the crystals to anhydrous sodium sulfate, sulphur dioxide and water and then separating the anhydrous sodium sulfate.

50 Claims, 9 Drawing Sheets

PROCESSING OF COBALTOUS SULPHA/DITHIONATE LIQUORS DERIVED FROM COBALT RESOURCE

PREVIOUS APPLICATION

This application is a non-provisional application claiming the priority of provisional application No. 62/421,139, filed on Nov. 11, 2016.

TECHNICAL FIELD

The present invention relates to the recovery of water and sulphate salts from sulphate and dithionate containing liquors such as those derived from hydrometallurgical processing of cobalt containing resource material such as cathode materials from lithium ion batteries.

BACKGROUND OF THE INVENTION

It is generally known that cobalt may be leached from higher valent cobalt containing resource material, such as cobalt (III) oxide, using a reducing agent such as sulphur dioxide in combination with sulphuric acid, to produce cobaltous sulphate and cobaltous dithionate. This is described in the following reactions:

$$Co_2O_3 + SO_2 + H_2SO_4 = 2CoSO_4 + H_2O$$

$$Co_2O_3 + 2SO_2 + H_2SO_4 = 2CoS_2O_6 + H_2O$$

Cobalt present in rechargeable lithium ion battery cathode material is in the trivalent state and is expected to be leached with sulphur dioxide and sulphuric acid. Lithium cobalt oxide, such as $LiCoO_2$ is a common cathode material for high energy lithium ion batteries typically used in personal electronic devices is expected to leach according to the following reactions:

$$2LiCoO_2 + SO_2 + 2H_2SO_4 = Li_2SO_4 + 2CoSO_4 + 2H_2O$$

$$2LiCoO_2 + 3SO_2 + 2H_2SO_4 = Li_2SO_4 + 2CoS_2O_6 + 2H_2O$$

$$2LiCoO_2 + 4SO_2 + 2H_2SO_4 = Li_2S_2O_6 + 2CoS_2O_6 + 2H_2O$$

Experimental work conducted on leaching lithium cobalt oxide with sulphur dioxide and sulphuric acid confirmed that up to 100% extractions of lithium and cobalt were achieved and that dithionate was detected in all leach tests conducted.

Lithium nickel manganese cobalt oxide, such as $LiNi_{0.33}Mn_{0.33}Co_{0.33}O_2$ is an emerging cathode material having both high energy and high power suitable for use in electric vehicles is expected to leach according to the following reactions:

$$2LiNi_{0.33}Mn_{0.33}Co_{0.33}O_2 + SO_2 + 2H_2SO_4 = Li_2SO_4 + 2(Ni,Co,Mn)SO_4 + 2H_2O$$

$$2LiNi_{0.33}Mn_{0.33}Co_{0.33}O_2 + 3SO_2 + 2H_2SO_4 = Li_2SO_4 + 2(Ni,Co,Mn)CoS_2O_6 + 2H_2O$$

$$2LiNi_{0.33}Mn_{0.33}Co_{0.33}O_2 + 4SO_2 + 2H_2SO_4 = Li_2S_2O_6 + 2(Ni,Co,Mn)S_2O_6 + 2H_2O$$

$(Ni,Co,Mn)SO_4$ and $(Ni,Co,Mn)S_2O_6$ represent a mixed metal sulphate and a mixed metal dithionate respectively.

Experimental work conducted on leaching lithium nickel manganese cobalt oxide with sulphur dioxide and sulphuric acid confirmed that up to 100% extractions of lithium, nickel, manganese and cobalt were achieved and that dithionate was detected in all leach tests conducted.

Lithium nickel cobalt aluminum oxide, such as $LiNi_{0.8}Co_{0.15}Al_{0.05}O_2$ is another emerging cathode material having both high energy and high power suitable for use in electric vehicles is expected to leach according to the following reactions:

$$2LiNi_{0.8}Co_{0.15}Al_{0.05}O_2 + SO_2 + 2H_2SO_4 = Li_2SO_4 + 2(Ni,Co,Al)SO_4 + 2H_2O$$

$$2LiNi_{0.8}Co_{0.15}Al_{0.05}O_2 + 3SO_2 + 2H_2SO_4 = Li_2SO_4 + 2(Ni,Co,Al)CoS_2O_6 + 2H_2O$$

$$2LiNi_{0.8}Co_{0.15}Al_{0.05}O_2 + 4SO_2 + 2H_2SO_4 = Li_2S_2O_6 + 2(Ni,Co,Al)S_2O_6 + 2H_2O$$

$(Ni,Co,Al)SO_4$ and $(Ni,Co,Al)S_2O_6$ represent a mixed metal sulphate and a mixed metal dithionate respectively.

Experimental work conducted on leaching lithium nickel manganese cobalt oxide with sulphur dioxide and sulphuric acid confirmed that up to 100% extractions of lithium, nickel, cobalt and aluminum were achieved and that dithionate was detected in all leach tests conducted.

There is no known prior art method of recovering valuable metals from spent lithium ion battery cathode materials containing cobalt that uses reductive leaching with sulphur dioxide while dealing with dithionates and recovery of water in an energy efficient manner. Although U.S. Pat. No. 8,460,631 describes the processing of manganese sulphate and manganese dithionate containing liquors, which also contain sodium sulphate and sodium dithionate, it is not obvious from that invention how sodium sulphate and sodium dithionate could be processed together with cobaltous sulphate and cobaltous dithionate in the presence or absence of lithium sulphate and lithium dithionate. Furthermore, it has been discovered that the process of dealing with dithionates and recovery of water and recirculating treated solutions back to the leach in a locked cycle manner significantly improves the recovery of lithium when present.

SUMMARY OF THE INVENTION

Accordingly one embodiment of the invention is a process of water removal and/or recycling from sodium sulphate and/or sodium dithionate containing liquors derived from processing cobalt resource material essentially free of lithium, comprising the steps of: a. precipitation of cobalt as cobaltous carbonate in whole or in part followed by its removal in whole or in part from the liquor for example by centrifugation or filtration; b. crystallization of sodium sulphate and sodium dithionate to separate the majority of sodium sulphate and sodium dithionate from solution; removal of sodium sulphate and sodium dithionate crystals; c. heating of sodium sulphate and sodium dithionate crystals to form anhydrous sodium sulphate, sulphur dioxide and water (steam); and d. separation of anhydrous sodium sulphate.

Another embodiment of the invention is a process of water removal and/or recycling from sodium sulphate and/or sodium dithionate containing liquors derived from processing cobalt resource material containing lithium, comprising the steps of: a. precipitation of cobalt as cobaltous carbonate in whole or in part and lithium in whole or in part as lithium carbonate followed by their removal in whole or in part from the liquor for example by centrifugation or filtration; b. crystallization of sodium sulphate and sodium dithionate to separate the majority of sodium sulphate and sodium dithionate from solution; c. removal of sodium sulphate and sodium dithionate crystals; and e. separation of anhydrous sodium sulphate.

A further embodiment of the invention is a process of water removal and/or recycling from sodium sulphate and/or sodium dithionate containing liquors derived from processing cobalt resource material essentially free of lithium, comprising the steps of: a. precipitation of cobalt as cobaltous hydroxide in whole or in part followed its removal in whole or in part from the liquor for example by centrifugation or filtration; b. crystallization of sodium sulphate and sodium dithionate to separate the majority of sodium sulphate and sodium dithionate from solution; c. removal of sodium sulphate and sodium dithionate crystals; d. heating of sodium sulphate and sodium dithionate crystals to form anhydrous sodium sulphate, sulphur dioxide and water (steam); and e. separation of anhydrous sodium sulphate.

A still further embodiment of the invention is a process of water removal and/or recycling from sodium sulphate and/or sodium dithionate containing liquors derived from processing cobalt resource material containing lithium, comprising the steps of: a. precipitation of cobalt as cobaltous hydroxide in whole or in part followed by its removal in whole or in part from the liquor for example by centrifugation or filtration; b. precipitation of lithium as lithium carbonate in whole or in part from the cobaltous hydroxide stripped liquor of 4a, followed by its removal in whole or in part from the liquor for example by centrifugation; c. crystallization of sodium sulphate and sodium dithionate to separate the majority of sodium sulphate and sodium dithionate from solution; d. removal of sodium sulphate and sodium dithionate crystals; and e. separation of anhydrous sodium sulphate.

BRIEF DESCRIPTION OF THE DRAWINGS

FIG. 1 illustrates a process flowsheet for a first embodiment to treat spent lithium cobalt oxide.

FIG. 2 illustrates a process flowsheet for a first embodiment to treat spent lithium nickel manganese cobalt oxide.

FIG. 3 illustrates a process flowsheet for a first embodiment to treat spent lithium nickel cobalt aluminum oxide.

BEST MODE FOR CARRYING OUT THE INVENTION

In accordance with the present invention there is provided a process for the hydrometallurgical processing of cobaltous sulphate and cobaltous dithionate containing liquors derived from sulphurous acid and sulphuric acid leaching of cobalt (III) oxide containing resource material such as those recovered from the cathode materials of lithium ion batteries.

Figure 1:
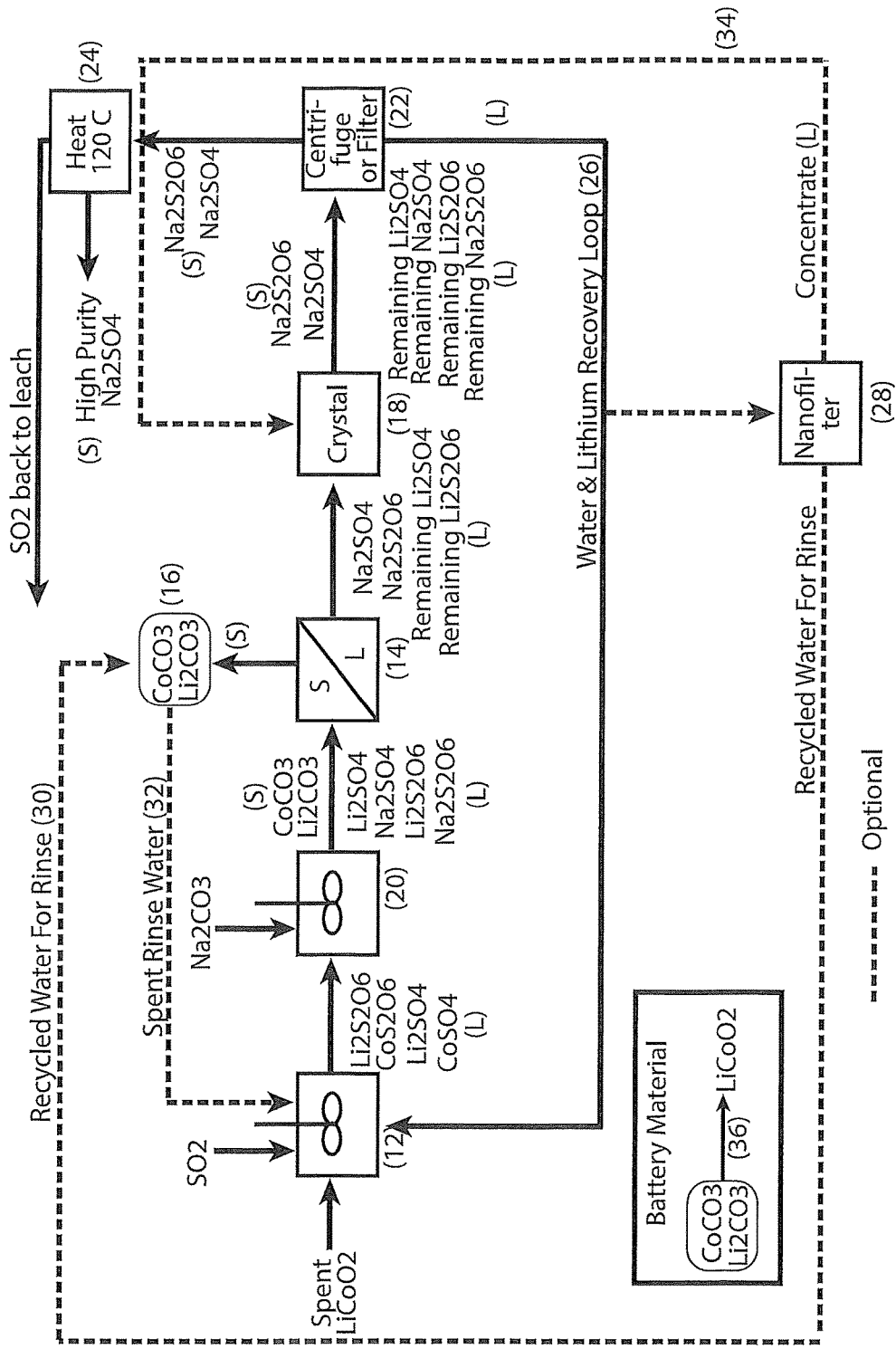
FIGS. 1 to 3 illustrates process flowsheets for a first embodiment of the present invention, with "S" indicating solid phase and "L" indicating liquid phase.
Figure 2:
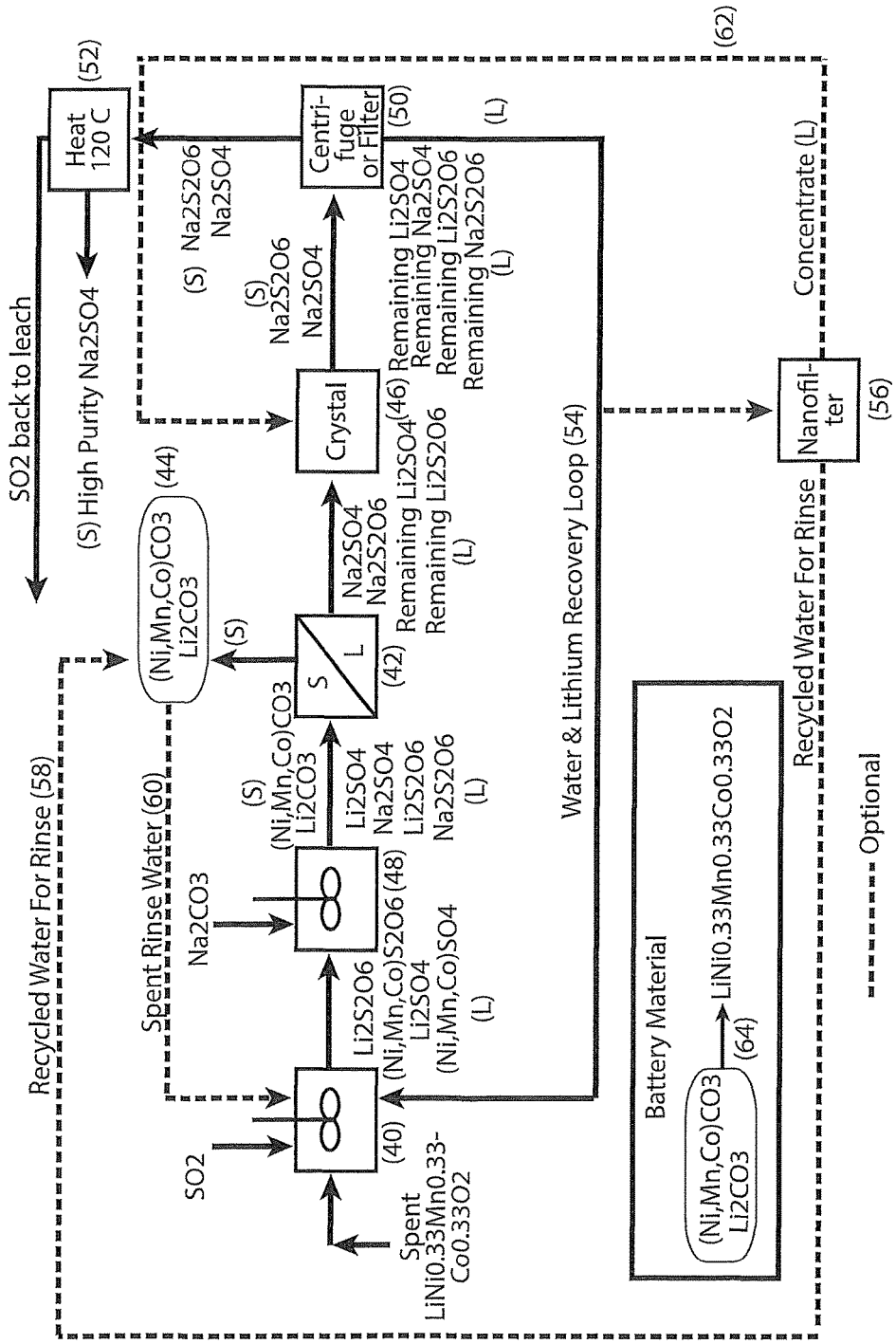
Figure 3:
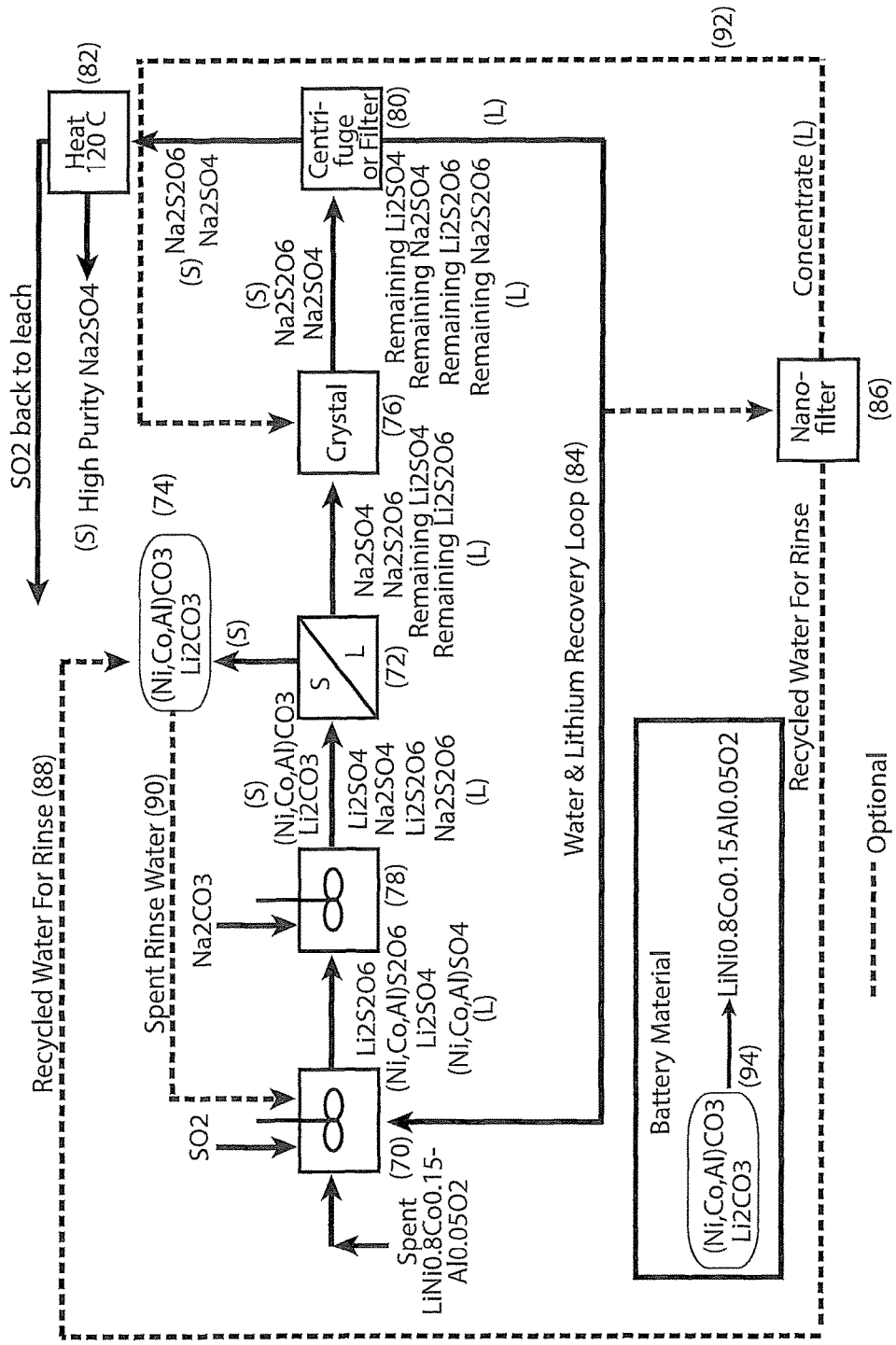

For embodiment one, referring to FIGS. 1-3.

Cobaltous sulphate and cobaltous dithionate containing liquor are treated with sodium carbonate to form cobaltous carbonate solids and a sodium sulphate and sodium dithionate containing liquor.

Lithium sulphate and lithium dithionate, if present, will be partially precipitated as lithium carbonate solids along with the cobaltous carbonate solids.

Cobaltous carbonate containing solids and lithium carbonate solids, if present, are removed from the carbonate treated liquor by filtration or centrifugation.

Cobaltous carbonate containing solids and lithium carbonate solids, if present, are washed to remove soluble impurities and produce clean materials for reuse, such as for cathode materials for lithium ion batteries.

Sodium sulphate and sodium dithionate along with remaining lithium sulphate and lithium dithionate, if present, containing filtrate or centrifugate are treated with a crystallizer to crystallize the majority of sodium sulphate and sodium dithionate crystals.

Crystallization can be conducted by cooling to precipitate (crystallize) sodium sulphate decahydrate and sodium dithionate dihydrate or by multi-effect crystallization to precipitate (crystallize) anhydrous sodium sulphate and sodium dithionate.

Sodium sulphate and sodium dithionate crystals are heated to a temperature sufficient to convert sodium dithionate crystals to sodium sulphate and recyclable sulphur dioxide and water for leaching of cobalt resource material. The temperatures for converting sodium dithionate to sodium sulphate and sulphur dioxide are described by Chow et al, ("New Developments in the Recovery of Manganese from Lower-grade Resources", Minerals & Metallurgical Processing, Vol. 29, No. 1, February 2012, pp 70-71).

The crystallizer liquor, having the majority of sodium sulphate and sodium dithionate removed and containing lithium sulphate and lithium dithionate, if lithium was present in the resource material, is recycled into the leach circuit for further recovery of lithium and cobalt that was not recovered previously and reuse of water in an energy efficient manner.

Alternatively, a portion of the crystallizer liquor, having the majority of sodium sulphate and sodium dithionate removed and containing lithium sulphate and lithium dithionate, if lithium was present in the resource material, can be passed through a nanofiltration membrane to create a water rich sulphate and dithionate free liquor output for recycling and a sodium sulphate and sodium dithionate concentrate along with lithium sulphate and lithium dithionate for recycling to the sodium sulphate and sodium dithionate crystallizer.

The precipitated cobalt and lithium containing compounds can be used to manufacture cathode materials for lithium ion batteries. This is generally conducted by combining the desired ratio of cobalt and lithium containing compounds and performing a heat treatment procedure on the mixture. Jones et al ("$Li_xCoO_2$ (0<x≤1): A New Cathode Material for Batteries of High Energy Density", Solid State Ionics, ¾, 1981, pp 171-174) describes a method to manufacture lithium cobalt oxide cathode materials by treating lithium and cobalt compounds. Lu et al ("U.S. Pat. No. 8,685,565", April 2014) describes a method to manufacture lithium nickel manganese cobalt oxide by treating lithium, nickel, manganese and cobalt compounds. Kim et al ("Synthesis of High-Density Nickel Cobalt Aluminum Hydroxide by Continuous Coprecipitation Method", ACS Applied Materials & Interfaces, 4, 2012, pp 586-589) describes a method to manufacture lithium nickel cobalt aluminum oxide by treating lithium, nickel, cobalt and aluminum compounds. Commercial battery manufacturers typically develop and use their own proprietary treatment methods to produce cathode materials for lithium ion batteries.

The conversion of cobaltous sulphate and cobaltous dithionate to sodium sulphate and sodium dithionate provides for novel methods of dealing with dithionates, increasing the recovery of lithium and recycling water in an energy efficient manner.

Figure 4:
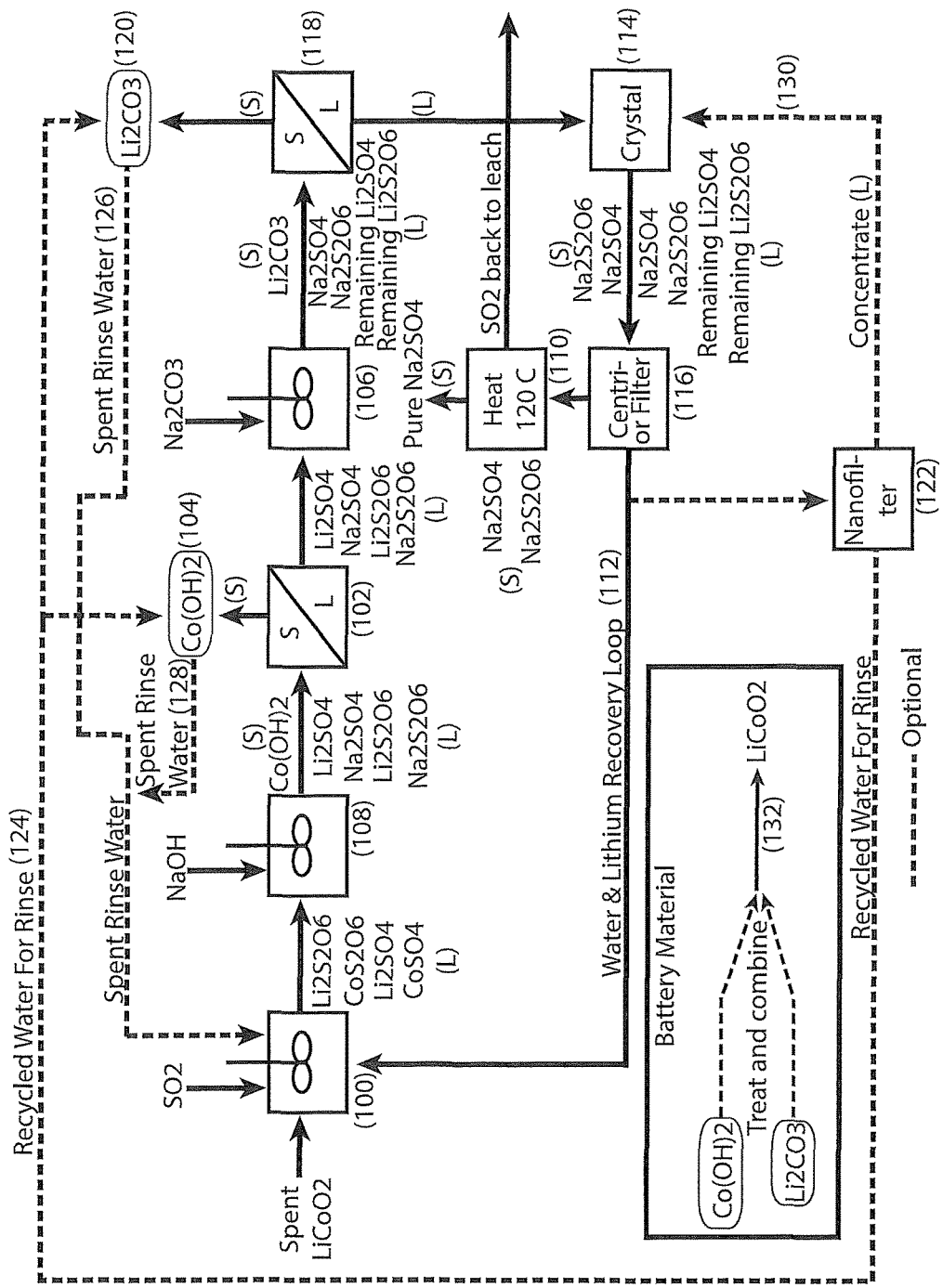
FIG. 4 illustrates a process flowsheet for a second embodiment to treat spent lithium cobalt oxide.
Figure 5:
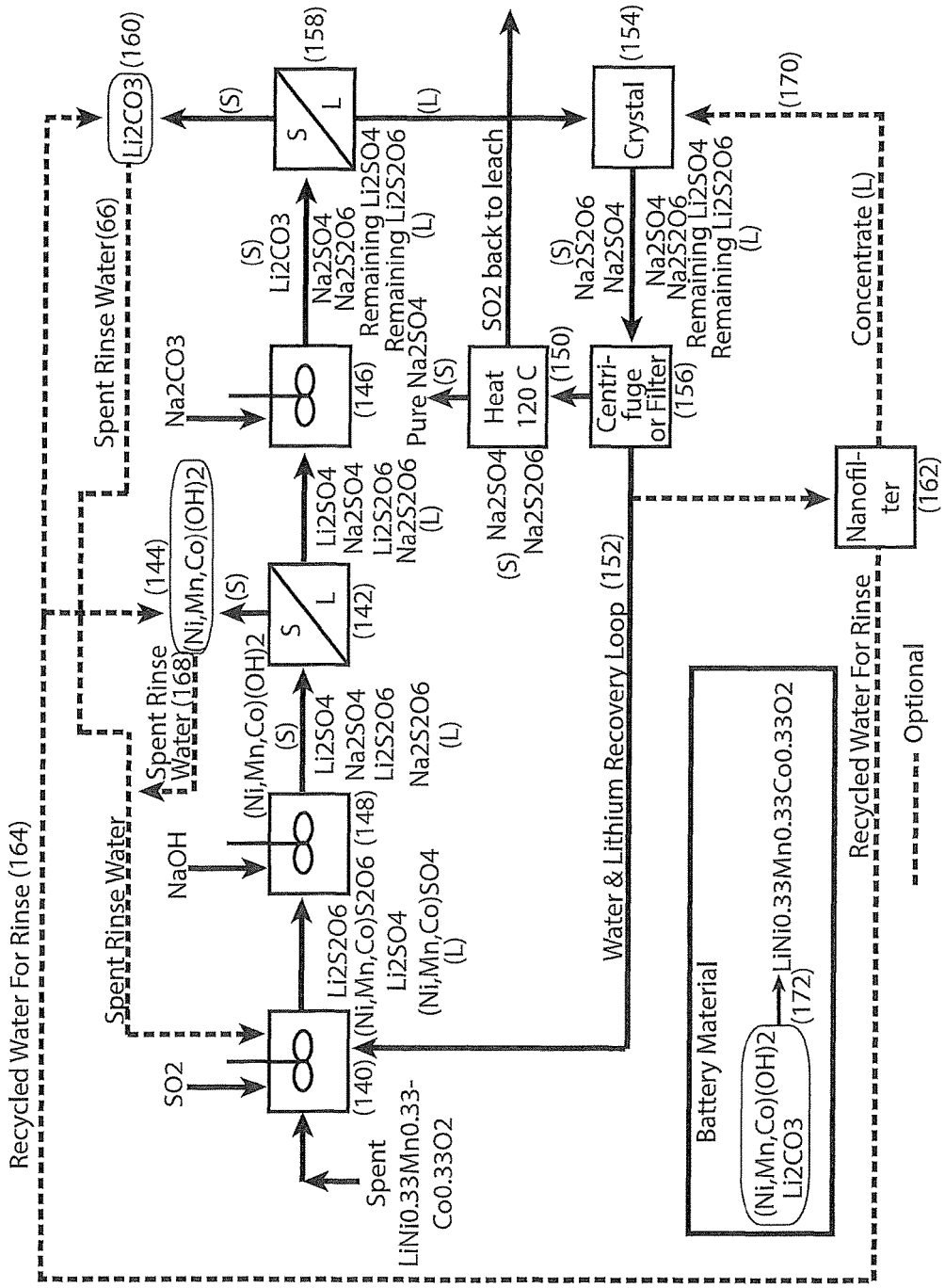
FIG. 5 illustrates a process flowsheet for a second embodiment to treat spent lithium nickel manganese cobalt oxide.
Figure 6:
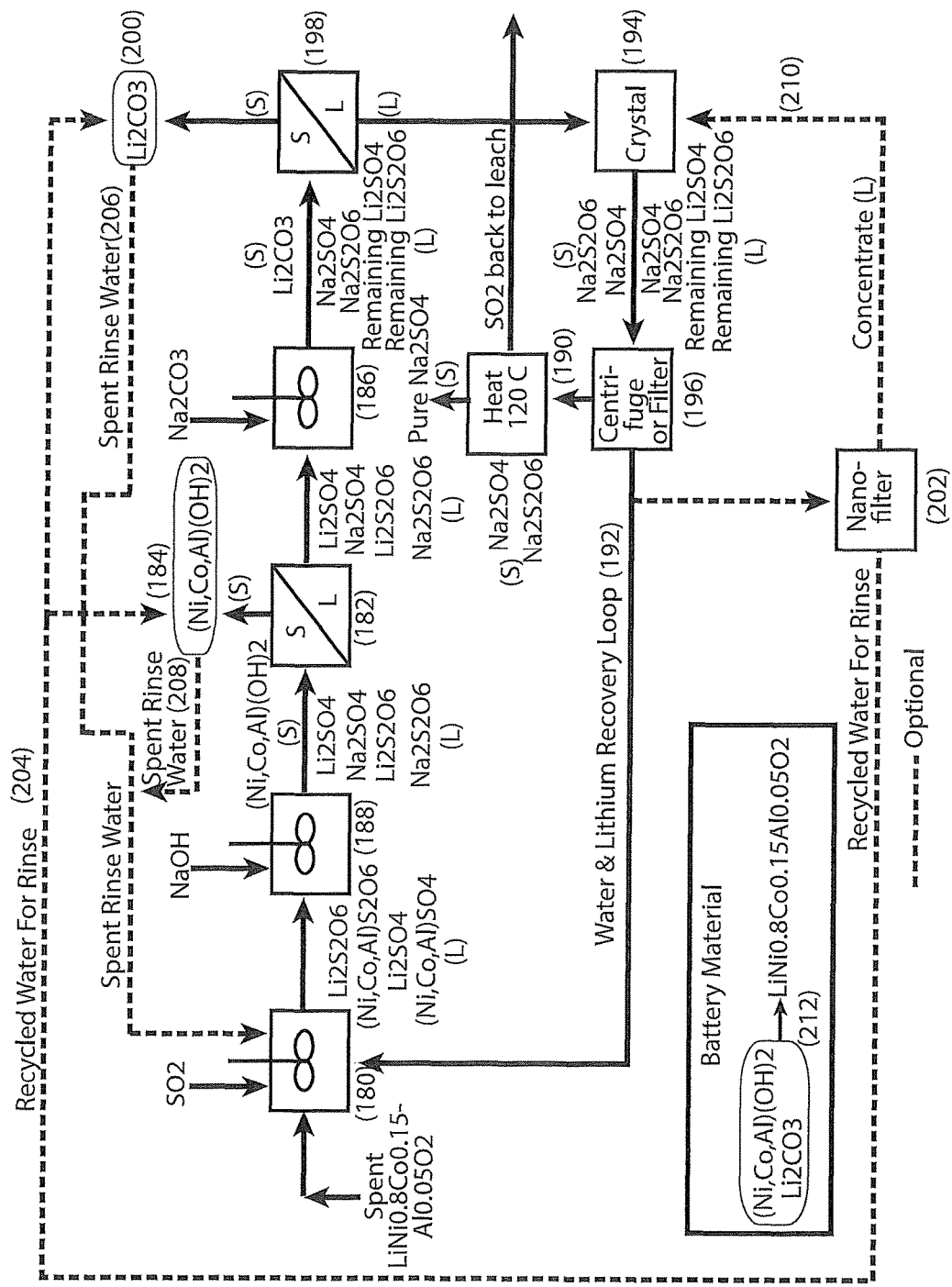
FIG. 6 illustrates a process flowsheet for a second embodiment to treat spent lithium nickel cobalt aluminum oxide.

For embodiment two, referring to FIGS. 4-6

Cobaltous sulphate and cobaltous dithionate containing liquors are treated with sodium hydroxide to form cobaltous hydroxide solids and a sodium sulphate and sodium dithionate containing liquor;

Cobaltous hydroxide containing solids are removed from the hydroxide treated liquor by filtration or centrifugation;

Cobaltous hydroxide containing solids are washed to remove soluble impurities and produce clean materials for reuse, such as for cathode materials for lithium ion batteries;

The addition of sodium carbonate to the remaining solution precipitates part of the lithium, if present, as lithium carbonate;

Lithium carbonate solids are removed from the carbonate treated liquor by filtration or centrifugation;

Lithium carbonate solids are washed to remove soluble impurities and produce clean materials for reuse, such as for cathode materials for lithium ion batteries;

Sodium sulphate and sodium dithionate along with remaining lithium sulphate and lithium dithionate, if present, containing filtrate or centrifugate are treated with a crystallizer to crystallize the majority of sodium sulphate and sodium dithionate crystals;

Crystallization can be conducted by cooling to precipitate (crystallize) sodium sulphate decahydrate and sodium dithionate dihydrate or by multi-effect crystallization to precipitate (crystallize) anhydrous sodium sulphate and sodium dithionate;

Sodium sulphate and sodium dithionate crystals are heated to a temperature sufficient to convert sodium dithionate crystals to sodium sulphate and recyclable sulphur dioxide and water for leaching of cobalt resource material;

The crystallizer liquor, having the majority of sodium sulphate and sodium dithionate removed and containing lithium sulphate and lithium dithionate, if lithium was present in the resource material, is recycled into the leach circuit for further recovery of lithium and cobalt that was not recovered previously and reuse of water in an energy efficient manner.

Alternatively, a portion of the crystallizer liquor, having the majority of sodium sulphate and sodium dithionate removed and containing lithium sulphate and lithium dithionate, if lithium was present in the resource material, can be passed through a nanofiltration membrane to create a water rich sulphate and dithionate free liquor output for recycling and a sodium sulphate and sodium dithionate concentrate along with lithium sulphate and lithium dithionate, if lithium was present in the resource material, for recycling to the sodium sulphate and sodium dithionate crystallizer.

Figure 7:
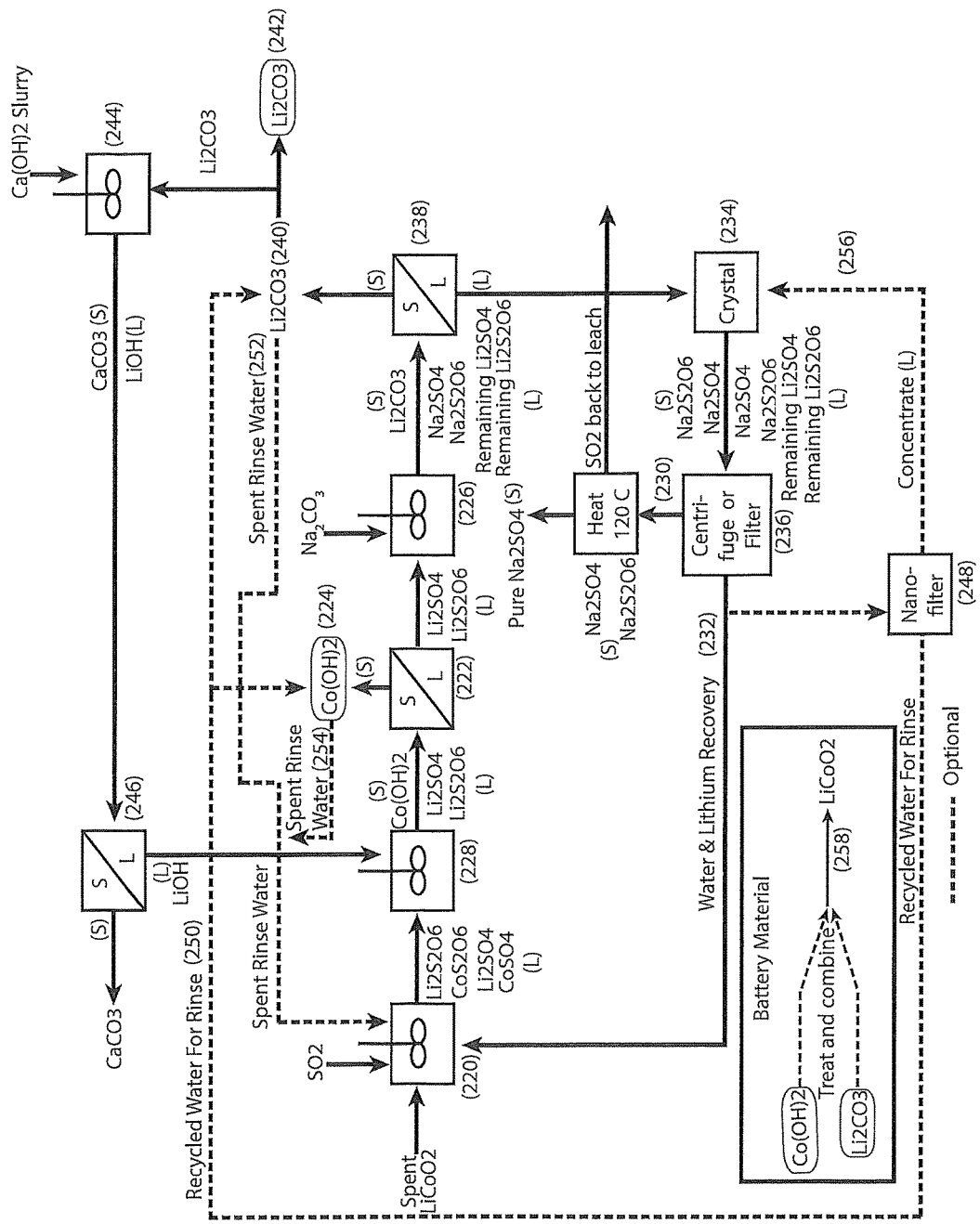
FIG. 7 illustrates a process flowsheet for a third embodiment to treat spent lithium cobalt oxide.
Figure 8:
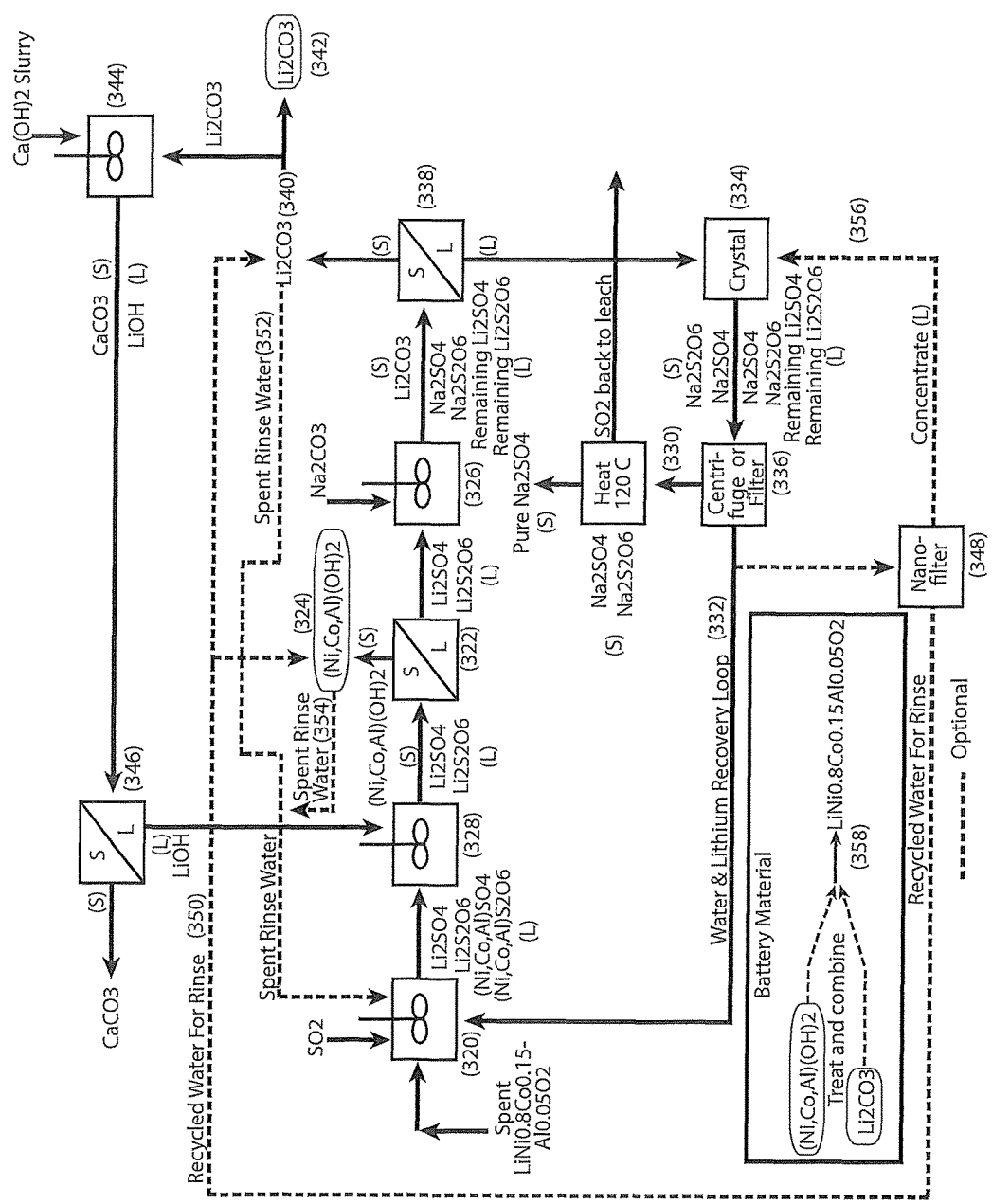
FIG. 8 illustrates a process flowsheet for a third embodiment to treat spent lithium nickel manganese cobalt oxide.
Figure 9:
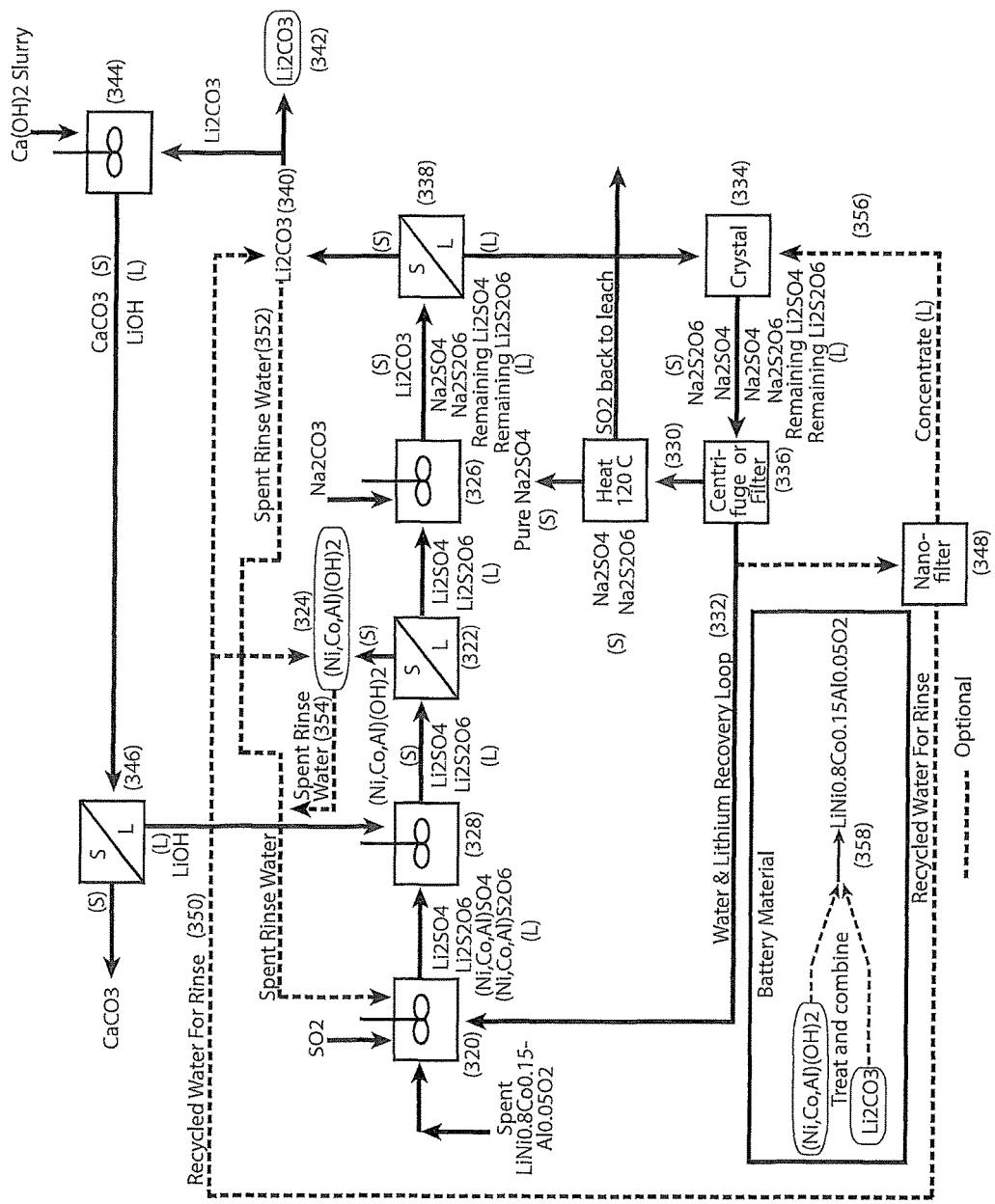
FIG. 9 illustrates a process flowsheet for a third embodiment to treat spent lithium nickel cobalt aluminum oxide.

For embodiment three, referring to FIGS. 7-9.

Cobaltous sulphate and cobaltous dithionate containing liquors are treated with lithium hydroxide to form cobaltous hydroxide solids and a lithium sulphate and lithium dithionate containing liquor;

The lithium hydroxide can be produced by treating lithium carbonate recovered by previous operation of the flowsheet. Wietelmann et al ("Lithium and Lithium Compounds", Ullmann's Encyclopedia of Industrial Chemistry, Wiley-VCH Verlag GmbH & Co, 2013, pp 24) describes a method of producing lithium hydroxide by reacting lithium carbonate with calcium hydroxide;

Cobaltous hydroxide containing solids are removed from the hydroxide treated liquor by filtration or centrifugation;

Cobaltous hydroxide containing solids are washed to remove soluble impurities and produce clean materials for reuse, such as for cathode materials for lithium ion batteries;

The addition of sodium carbonate to the remaining solution precipitates part of the lithium, if present, as lithium carbonate;

Lithium carbonate solids are removed from the carbonate treated liquor by filtration or centrifugation;

Lithium carbonate solids are washed to remove soluble impurities and produce clean materials for reuse, such as for cathode materials for lithium ion batteries;

Sodium sulphate and sodium dithionate along with remaining lithium sulphate and lithium dithionate, if present, containing filtrate or centrifugate are treated with a crystallizer to crystallize the majority of sodium sulphate and sodium dithionate crystals;

Crystallization can be conducted by cooling to precipitate (crystallize) sodium sulphate decahydrate and sodium dithionate dihydrate or by multi-effect crystallization to precipitate (crystallize) anhydrous sodium sulphate and sodium dithionate;

Sodium sulphate and sodium dithionate crystals are heated to a temperature sufficient to convert sodium dithionate crystals to sodium sulphate and recyclable sulphur dioxide and water for leaching of cobalt resource material;

The crystallizer liquor, having the majority of sodium sulphate and sodium dithionate removed and containing lithium sulphate and lithium dithionate, if lithium was present in the resource material, is recycled into the leach circuit for further recovery of lithium and cobalt not recovered previously and reuse of water in an energy efficient manner.

Alternatively, a portion of the crystallizer liquor, having the majority of sodium sulphate and sodium dithionate removed and containing lithium sulphate and lithium dithionate can be passed through a nanofiltration membrane to create a water rich sulphate and dithionate free liquor output for recycling and a sodium sulphate and sodium dithionate concentrate along with lithium sulphate and lithium dithionate for recycling to the sodium sulphate and sodium dithionate crystallizer.

The precipitated cobalt and lithium containing compounds can be used to manufacture cathode materials for lithium ion batteries.

With respect to embodiment one for treatment of lithium cobalt oxide shown in FIG. 1, the flowsheet is described as follows:

In the leach reactor (12), spent lithium ion battery cathode material with the chemical formula $LiCoO_2$ is combined and mixed with $SO_2$ and $H_2SO_4$ reagent and a solution containing water, and possibly lithium and/or cobalt that has not been recovered previously from the last stages of the flowsheet. Lithium and cobalt are dissolved in solution producing a leach solution containing cobalt sulphate, cobalt dithionate, lithium sulphate and lithium dithionate.

The leach solution is transferred to a precipitation reactor (20) where sodium carbonate solution is added and mixed to precipitate cobalt and part of the dissolved lithium as cobalt and lithium carbonate solid and forming a solution containing mainly lithium sulphate, lithium dithionate, sodium sulphate and sodium dithionate.

The precipitation reactions occur as follows:

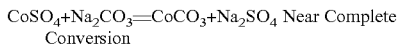
$CoSO_4+Na_2CO_3=CoCO_3+Na_2SO_4$ Near Complete Conversion

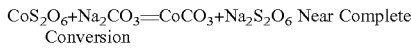
$CoS_2O_6+Na_2CO_3=CoCO_3+Na_2S_2O_6$ Near Complete Conversion

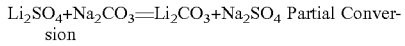
$Li_2SO_4+Na_2CO_3=Li_2CO_3+Na_2SO_4$ Partial Conversion

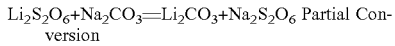
$Li_2S_2O_6+Na_2CO_3=Li_2CO_3+Na_2S_2O_6$ Partial Conversion

The slurry containing a mixture of solids and liquids is filtered (14) to separate lithium carbonate and cobalt carbonate which is rinsed to produce a collected product (16).

The filtrate is transferred to a crystallizer (18) where part of the sodium sulphate and sodium dithionate is crystallized as solid crystals by multi-effect crystallization or cooling crystallization. The solid sodium sulphate and sodium dithionate crystals are collected from solution with a centrifuge or filter (22). Heating of the sodium sulphate and sodium dithionate crystals to approximately 120° C. (24) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (26) back to the leach to minimize water consumption and maximize lithium recovery of the overall flowsheet. Alternatively, a portion of the mother solution can be treated by nanofiltration (28) to produce clean water (30) for rinsing products and reuse of the spent rinse water (32) back to the leach. The concentrate from nanofiltration (34) is recycled back to the crystallizer to maximize sodium sulphate recovery. The mixed lithium carbonate and cobalt carbonate collected product (16) is heat treated (36) to manufacture new cathode compounds for use in lithium ion batteries. If required, additional lithium carbonate and or cobalt carbonate may be added to the collected product to achieve the desired ratio of lithium and cobalt prior to heat treatment.

With respect to embodiment one for treatment of lithium nickel manganese cobalt oxide shown in FIG. 2, the flowsheet is described as follows:

In the leach reactor (40), spent lithium nickel manganese cobalt oxide cathode materials for example with the chemical formula $LiNi_{0.33}Mn_{0.33}Co_{0.33}O_2$ is combined and mixed with $SO_2$ and $H_2SO_4$ reagent and a solution containing water, and possibly lithium and/or nickel and/or manganese and/or cobalt that has not been recovered previously from the last stages of the flowsheet. Lithium, nickel, manganese and cobalt are dissolved in solution producing a leach solution containing a nickel manganese cobalt sulphate, nickel manganese cobalt dithionate, lithium sulphate and lithium dithionate.

The leach solution is transferred to a precipitation reactor (48) where sodium carbonate is added and mixed to precipitate nickel, manganese and cobalt and part of the dissolved lithium as nickel, manganese, cobalt and lithium carbonate solid and forming a solution containing mainly lithium sulphate, lithium dithionate, sodium sulphate and sodium dithionate.

The precipitation reactions occur as follows:

$(Ni,Mn,Co)SO_4+Na_2CO_3=(Ni,Mn,Co)CO_3+Na_2SO_4$ Near Complete Conversion

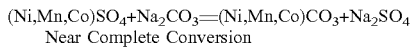
$(Ni,Mn,Co)S_2O_6+Na_2CO_3=(Ni,Mn,Co)CO_3+Na_2S_2O_6$ Near Complete Conversion

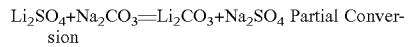
$Li_2SO_4+Na_2CO_3=Li_2CO_3+Na_2SO_4$ Partial Conversion

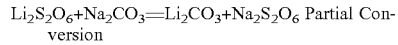
$Li_2S_2O_6+Na_2CO_3=Li_2CO_3+Na_2S_2O_6$ Partial Conversion

The slurry containing a mixture of solids and liquids is filtered (42) to separate lithium carbonate and nickel manganese cobalt carbonate which is rinsed to produce a collected product (44).

The filtrate is transferred to a crystallizer (46) where part of the sodium sulphate and sodium dithionate is crystallized as solid crystals by multi-effect crystallization or cooling crystallization. The solid sodium sulphate and sodium dithionate crystals are collected from solution with a centrifuge or filter (50). Heating of the sodium sulphate and sodium dithionate crystals to approximately 120° C. (52) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (54) back to the leach to minimize water consumption and maximize lithium recovery of the overall flowsheet. Alternatively, a portion of the mother solution can be treated by nanofiltration (56) to produce clean water (58) for rinsing products and reuse of the spent rinse water (60) back to the leach. The concentrate from nanofiltration (62) is recycled back to the crystallizer to maximize sodium sulphate recovery. The mixed lithium carbonate and nickel manganese cobalt carbonate collected product (44) is heat treated (64) to manufacture new cathode compounds for use in lithium ion batteries. If required, additional lithium, nickel, manganese and or cobalt compounds may be added to the collected product to achieve the desired ratio of lithium, nickel, manganese and cobalt prior to heat treatment.

With respect to embodiment one for treatment of lithium nickel cobalt aluminum oxide shown in FIG. 3, the flowsheet is described as follows:

In the leach reactor (70), spent lithium nickel cobalt aluminum oxide cathode materials for example with the chemical formula $LiNi_{0.8}Co_{0.15}Al_{0.05}O_2$ is combined and mixed with $SO_2$ and $H_2SO_4$ reagent and a solution containing water, and possibly lithium and/or nickel and/or cobalt and/or aluminum that has not been recovered previously from the last stages of the flowsheet. Lithium, nickel, cobalt and aluminum are dissolved in solution producing a leach solution containing a nickel cobalt aluminum sulphate, nickel cobalt aluminum dithionate, lithium sulphate and lithium dithionate.

The leach solution is transferred to a precipitation reactor (78) where sodium carbonate is added and mixed to precipitate nickel, cobalt and aluminum and part of the dissolved lithium as nickel, cobalt, aluminum and lithium carbonate solid and forming a solution containing mainly lithium sulphate, lithium dithionate, sodium sulphate and sodium dithionate.

The precipitation reactions occur as follows:

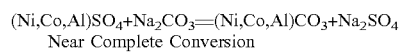
$(Ni,Co,Al)SO_4+Na_2CO_3=(Ni,Co,Al)CO_3+Na_2SO_4$ Near Complete Conversion

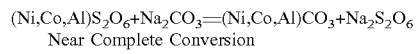
$(Ni,Co,Al)S_2O_6+Na_2CO_3=(Ni,Co,Al)CO_3+Na_2S_2O_6$ Near Complete Conversion

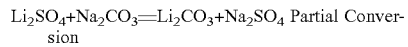
$Li_2SO_4+Na_2CO_3=Li_2CO_3+Na_2SO_4$ Partial Conversion

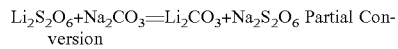
$Li_2S_2O_6+Na_2CO_3=Li_2CO_3+Na_2S_2O_6$ Partial Conversion

The slurry containing a mixture of solids and liquids is filtered (72) to separate lithium carbonate and nickel cobalt aluminum carbonate which is rinsed to produce a collected product (74).

The filtrate is transferred to a crystallizer (76) where part of the sodium sulphate and sodium dithionate is crystallized as solid crystals by multi-effect crystallization or cooling crystallization. The solid sodium sulphate and sodium dithionate crystals are collected from solution with a centrifuge or filter (80). Heating of the sodium sulphate and sodium dithionate crystals to approximately 120° C. (82) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (84) back to the leach to minimize water consumption and maximize lithium recovery of the overall flowsheet. Alternatively, a portion of the mother solution can be treated by nanofiltration (86) to produce clean water (88) for rinsing products and reuse of the spent rinse water (90) back to the leach. The concentrate from nanofiltration (92) is recycled back to the crystallizer to maximize sodium sulphate recovery. The mixed lithium carbonate and nickel cobalt aluminum carbonate collected product (74) is heat treated (94) to manufacture new cathode compounds for use in lithium ion batteries. If required, additional lithium, nickel, cobalt and or aluminum compounds may be added to the collected product to achieve the desired ratio of lithium, nickel, cobalt and aluminum prior to heat treatment.

With respect to embodiment two for treatment of lithium cobalt oxide shown in FIG. 4, the flowsheet is described as follows:

In the leach reactor (100), spent lithium ion battery cathode materials with the chemical formula $LiCoO_2$ is combined and mixed with $SO_2$ and $H_2SO_4$ reagent and a solution containing water, and possibly lithium and/or cobalt that has not been recovered previously from the last stages of the flowsheet. Lithium and cobalt are dissolved in solution producing a leach solution containing cobalt sulphate, cobalt dithionate, lithium sulphate and lithium dithionate.

The leach solution is transferred to a precipitation reactor (108) where sodium hydroxide is added and mixed to selectively precipitate cobalt as cobalt hydroxide and forming a solution containing mainly lithium sulphate, lithium dithionate, sodium sulphate and sodium dithionate.

The precipitation reactions occur as follows:

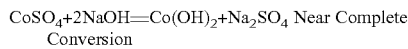
$CoSO_4 + 2NaOH = Co(OH)_2 + Na_2SO_4$ Near Complete Conversion

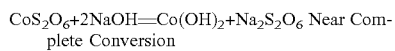
$CoS_2O_6 + 2NaOH = Co(OH)_2 + Na_2S_2O_6$ Near Complete Conversion

The slurry containing a mixture of solids and liquids is filtered (102) to separate the cobalt hydroxide which is rinsed to produce a collected product (104).

The filtered solution is transferred to a second precipitation reactor (106) where sodium carbonate is added and mixed to precipitate part of the dissolved lithium as lithium carbonate solid and forming a solution containing mainly lithium sulphate, lithium dithionate, sodium sulphate and sodium dithionate.

The slurry containing a mixture of solids and liquids is filtered (118) to separate lithium carbonate which is rinsed to produce a collected product (120).

The filtrate is transferred to a crystallizer (114) where part of the sodium sulphate and sodium dithionate is crystallized as solid crystals by multi-effect crystallization or cooling crystallization. The solid sodium sulphate and sodium dithionate crystals are collected from solution with a centrifuge or filter (116). Heating of the sodium sulphate and sodium dithionate crystals to approximately 120° C. (110) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (112) back to the leach to minimize water consumption and maximize lithium recovery of the overall flowsheet. Alternatively, a portion of the mother solution can be treated by nanofiltration (122) to produce clean water (124) for rinsing products and reuse of the spent rinse water (126, 128) back to the leach. The concentrate from nanofiltration (130) is recycled back to the crystallizer to maximize sodium sulphate recovery. The lithium carbonate (120) and cobalt hydroxide (104) collected products are mixed to the desired ratio of lithium and cobalt and heat treated (132) to manufacture new cathode compounds for use in lithium ion batteries. If required, additional lithium and or cobalt compounds may be added to the collected product to achieve the desired ratio of lithium and cobalt prior to heat treatment.

With respect to embodiment two for treatment of lithium nickel manganese cobalt oxide shown in FIG. 5, the flowsheet is described as follows:

In the leach reactor (140), spent lithium nickel manganese cobalt oxide cathode materials for example with the chemical formula $LiNi_{0.33}Mn_{0.33}Co_{0.33}O_2$ is combined and mixed with $SO_2$ and $H_2SO_4$ reagent and a solution containing water, and possibly lithium and/or nickel and/or manganese and/or cobalt that has not been recovered previously from the last stages of the flowsheet. Lithium, nickel, manganese and cobalt are dissolved in solution producing a leach solution containing nickel manganese cobalt sulphate, nickel manganese cobalt dithionate, lithium sulphate and lithium dithionate.

The leach solution is transferred to a precipitation reactor (148) where sodium hydroxide is added and mixed to selectively precipitate nickel, manganese and cobalt as nickel manganese cobalt hydroxide and forming a solution containing mainly lithium sulphate, lithium dithionate, sodium sulphate and sodium dithionate.

The precipitation reactions occur as follows:

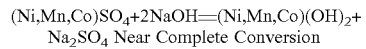
$(Ni,Mn,Co)SO_4 + 2NaOH = (Ni,Mn,Co)(OH)_2 + Na_2SO_4$ Near Complete Conversion

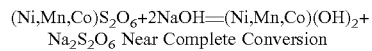
$(Ni,Mn,Co)S_2O_6 + 2NaOH = (Ni,Mn,Co)(OH)_2 + Na_2S_2O_6$ Near Complete Conversion The slurry containing a mixture of solids and liquids is filtered (142) to separate the nickel manganese cobalt hydroxide which is rinsed to produce a collected product (144).

The filtered solution is transferred to a second precipitation reactor (146) where sodium carbonate is added and mixed to precipitate part of the dissolved lithium as lithium carbonate solid and forming a solution containing mainly lithium sulphate, lithium dithionate, sodium sulphate and sodium dithionate.

The slurry containing a mixture of solids and liquids is filtered (158) to separate the lithium carbonate which is rinsed to produce a collected product (160).

The filtrate is transferred to a crystallizer (154) where part of the sodium sulphate and sodium dithionate is crystallized as solid crystals by multi-effect crystallization or cooling crystallization. The solid sodium sulphate and sodium dithionate crystals are collected from solution with a centrifuge or filter (156). Heating of the sodium sulphate and sodium dithionate crystals to approximately 120° C. (150) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (152) back to the leach to minimize water consumption and maximize lithium recovery of the overall flowsheet. Alternatively, a portion of the mother solution can be treated by nanofiltration (162) to produce clean water (164) for rinsing products and reuse of the spent rinse water (166, 168) back to the leach. The concentrate from nanofiltration (170) is recycled back to the crystallizer to maximize sodium sulphate recovery. The lithium carbonate (160) and nickel manganese cobalt hydroxide (144) collected products are mixed to the desired ratio of lithium, nickel, manganese and cobalt and heat treated (172) to manufacture new cathode compounds for use in lithium ion batteries. If required, additional lithium, nickel, manganese and or cobalt compounds may be added to the collected product to achieve the desired ratio of lithium, nickel, manganese and cobalt prior to heat treatment.

With respect to embodiment two for treatment of lithium nickel cobalt aluminum oxide shown in FIG. 6, the flowsheet is described as follows:

In the leach reactor (180), spent lithium nickel cobalt aluminum oxide cathode materials for example with the chemical formula $LiNi_{0.8}Co_{0.15}Al_{0.05}O_2$ is combined and mixed with $SO_2$ and $H_2SO_4$ reagent and a solution containing water, and possibly lithium and/or nickel and/or cobalt and/or aluminum that has not been recovered previously from the last stages of the flowsheet. Lithium, nickel, cobalt and aluminum are dissolved in solution producing a leach solution containing nickel cobalt aluminum sulphate, nickel cobalt aluminum dithionate, lithium sulphate and lithium dithionate.

The leach solution is transferred to a precipitation reactor (188) where sodium hydroxide is added and mixed to selectively precipitate nickel, cobalt and aluminum as nickel cobalt aluminum hydroxide and forming a solution containing mainly lithium sulphate, lithium dithionate, sodium sulphate and sodium dithionate.

The precipitation reactions occur as follows:

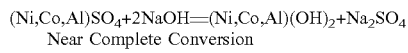
Near Complete Conversion

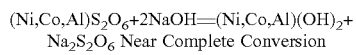
$Na_2S_2O_6$ Near Complete Conversion

The slurry containing a mixture of solids and liquids is filtered (182) to separate the nickel cobalt aluminum hydroxide which is rinsed to produce a collected product (184).

The filtered solution is transferred to a second precipitation reactor (186) where sodium carbonate is added and mixed to precipitate part of the dissolved lithium as lithium carbonate solid and forming a solution containing mainly lithium sulphate, lithium dithionate, sodium sulphate and sodium dithionate.

The slurry containing a mixture of solids and liquids is filtered (198) to separate the lithium carbonate which is rinsed to produce a collected product (200).

The filtrate is transferred to a crystallizer (194) where part of the sodium sulphate and sodium dithionate is crystallized as solid crystals by multi-effect crystallization or cooling crystallization. The solid sodium sulphate and sodium dithionate crystals are collected from solution with a centrifuge or filter (196). Heating of the sodium sulphate and sodium dithionate crystals to approximately 120° C. (190) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (192) back to the leach to minimize water consumption and maximize lithium recovery of the overall flowsheet. Alternatively, a portion of the mother solution can be treated by nanofiltration (202) to produce clean water (204) for rinsing products and reuse of the spent rinse water (206, 208) back to the leach. The concentrate from nanofiltration (210) is recycled back to the crystallizer to maximize sodium sulphate recovery. The lithium carbonate (200) and nickel cobalt aluminum hydroxide (184) collected products are mixed to the desired ratio of lithium, nickel, cobalt and aluminum and heat treated (212) to manufacture new cathode compounds for use in lithium ion batteries. If required, additional lithium, nickel, cobalt and or aluminum compounds may be added to the collected product to achieve the desired ratio of lithium, nickel, cobalt and aluminum prior to heat treatment.

With respect to embodiment three for treatment of lithium cobalt oxide shown in FIG. 7, the flowsheet is described as follows:

In the leach reactor (220), spent lithium ion battery cathode material with the chemical formula $LiCoO_2$ is combined and mixed with $SO_2$ and $H_2SO_4$ reagent and a solution containing water, and possibly lithium and/or cobalt that has not been recovered previously from the last stages of the flowsheet. Lithium and cobalt are dissolved in solution producing a leach solution containing cobalt sulphate, cobalt dithionate, lithium sulphate and lithium dithionate.

The leach solution is transferred to a precipitation reactor (228) where lithium hydroxide is added and mixed to selectively precipitate cobalt as cobalt hydroxide and forming a solution containing mainly lithium sulphate and lithium dithionate.

The precipitation reactions occur as follows:

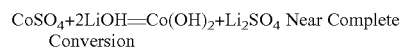
Near Complete Conversion

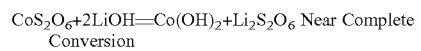
Near Complete Conversion

The slurry containing a mixture of solids and liquids is filtered (222) to separate the cobalt hydroxide which is rinsed to produce a collected product (224).

The filtered solution is transferred to a second precipitation reactor (226) where sodium carbonate is added and mixed to precipitate part of the dissolved lithium as lithium carbonate solid and forming a solution containing mainly lithium sulphate, lithium dithionate, sodium sulphate and sodium dithionate.

The slurry containing a mixture of solids and liquids is filtered (238) to separate the lithium carbonate which is rinsed (240). A portion of the lithium carbonate will be collected as a product (242). The other portion of the lithium carbonate will be further mixed with calcium hydroxide (244) to produce a slurry containing dissolved lithium hydroxide and solid calcium carbonate. The slurry will be filtered (246) to separate calcium carbonate solid and lithium hydroxide solution to be re-used to precipitate cobalt compounds (228).

The filtrate from the second filter (238) is transferred to a crystallizer (234) where part of the sodium sulphate and sodium dithionate is crystallized as solid crystals by multi-effect crystallization or cooling crystallization. The solid sodium sulphate and sodium dithionate crystals are collected from solution with a centrifuge or filter (236). Heating of the sodium sulphate and sodium dithionate crystals to approximately 120° C. (230) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (232) back to the leach to minimize water consumption and maximize lithium recovery of the overall flowsheet. Alternatively, a portion of the mother solution can be treated by nanofiltration (248) to produce clean water (250) for rinsing products and reuse of the spent rinse water (252, 254) back to the leach. The concentrate from nanofiltration (256) is recycled back to the crystallizer to maximize sodium sulphate recovery. The lithium carbonate (242) and cobalt hydroxide (224) collected products are mixed to the desired ratio of lithium and cobalt and heat treated (258) to manufacture new cathode compounds for use in lithium ion batteries. If required, additional lithium and or cobalt compounds may be added to the collected product to achieve the desired ratio of lithium and cobalt prior to heat treatment.

With respect to embodiment three for treatment of lithium nickel manganese cobalt oxide shown in FIG. 8, the flowsheet is described as follows:

In the leach reactor (270), spent lithium nickel manganese cobalt oxide cathode material for example with the chemical formula $LiNi_{0.33}Mn_{0.33}Co_{0.33}O_2$ is combined and mixed with $SO_2$ and $H_2SO_4$ reagent and a solution containing water, and possibly lithium and/or nickel and/or manganese and/or cobalt that has not been recovered previously from the last stages of the flowsheet. Lithium, nickel, manganese and cobalt are dissolved in solution producing a leach solution containing nickel manganese cobalt sulphate, nickel manganese cobalt dithionate, lithium sulphate and lithium dithionate.

The leach solution is transferred to a precipitation reactor (278) where lithium hydroxide is added and mixed to selectively precipitate nickel, manganese and cobalt as nickel manganese cobalt hydroxide and forming a solution containing mainly lithium sulphate and lithium dithionate.

The precipitation reactions occur as follows:

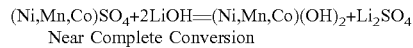
Near Complete Conversion

Near Complete Conversion

The slurry containing a mixture of solids and liquids is filtered (272) to separate the nickel manganese cobalt hydroxide which is rinsed to produce a collected product (274).

The filtered solution is transferred to a second precipitation reactor (276) where sodium carbonate is added and mixed to precipitate part of the dissolved lithium as lithium carbonate solid and forming a solution containing mainly lithium sulphate, lithium dithionate, sodium sulphate and sodium dithionate.

The slurry containing a mixture of solids and liquids is filtered (288) to separate the lithium carbonate which is rinsed (290). A portion of the lithium carbonate will be collected as a product (292). The other portion of the lithium carbonate will be further mixed with calcium hydroxide (294) to produce a slurry containing dissolved lithium hydroxide and solid calcium carbonate. The slurry will be filtered (296) to separate calcium carbonate solid and lithium hydroxide solution to be re-used to precipitate cobalt compounds (278).

The filtrate from the second filter (288) is transferred to a crystallizer (284) where part of the sodium sulphate and sodium dithionate is crystallized as solid crystals by multi-effect crystallization or cooling crystallization. The solid sodium sulphate and sodium dithionate crystals are collected from solution with a centrifuge or filter (286). Heating of the sodium sulphate and sodium dithionate crystals to approximately 120° C. (280) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (282) back to the leach to minimize water consumption and maximize lithium recovery of the overall flowsheet. Alternatively, a portion of the mother solution can be treated by nanofiltration (298) to produce clean water (300) for rinsing products and reuse of the spent rinse water (302, 304) back to the leach. The concentrate from nanofiltration (306) is recycled back to the crystallizer to maximize sodium sulphate recovery. The lithium carbonate (292) and nickel manganese cobalt hydroxide (274) collected products are mixed to the desired ratio of lithium, nickel, manganese and cobalt and heat treated (308) to manufacture new cathode compounds for use in lithium ion batteries. If required, additional lithium, nickel, manganese and or cobalt compounds may be added to the collected product to achieve the desired ratio of lithium, nickel, manganese and cobalt prior to heat treatment.

With respect to embodiment three for treatment of lithium nickel cobalt aluminum oxide shown in FIG. 9, the flowsheet is described as follows:

In the leach reactor (320), spent lithium nickel cobalt aluminum oxide cathode material for example with the chemical formula $LiNi_{0.8}Co_{0.15}Al_{0.05}O_2$ is combined and mixed with $SO_2$ and $H_2SO_4$ reagent and a solution containing water, and possibly lithium and/or nickel and/or cobalt and/or aluminum that has not been recovered previously from the last stages of the flowsheet. Lithium, nickel, cobalt and aluminum are dissolved in solution producing a leach solution containing nickel cobalt aluminum sulphate, nickel cobalt aluminum dithionate, lithium sulphate and lithium dithionate.

The leach solution is transferred to a precipitation reactor (328) where lithium hydroxide is added and mixed to selectively precipitate nickel, cobalt and aluminum as nickel cobalt aluminum hydroxide and forming a solution containing mainly lithium sulphate and lithium dithionate.

The precipitation reactions occur as follows:

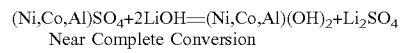
Near Complete Conversion

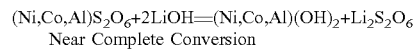
Near Complete Conversion

The slurry containing a mixture of solids and liquids is filtered (322) to separate the nickel cobalt aluminum hydroxide which is rinsed to produce a collected product (324).

The filtered solution is transferred to a second precipitation reactor (326) where sodium carbonate is added and mixed to precipitate part of the dissolved lithium as lithium carbonate solid and forming a solution containing mainly lithium sulphate, lithium dithionate, sodium sulphate and sodium dithionate.

The slurry containing a mixture of solids and liquids is filtered (338) to separate the lithium carbonate which is rinsed (340). A portion of the lithium carbonate will be collected as a product (342). The other portion of the lithium carbonate will be further mixed with calcium hydroxide (344) to produce a slurry containing dissolved lithium hydroxide and solid calcium carbonate. The slurry will be filtered (346) to separate calcium carbonate solid and lithium hydroxide solution to be re-used to precipitate nickel, cobalt and aluminum compounds (328).

The filtrate from the second filter (338) is transferred to a crystallizer (334) where part of the sodium sulphate and sodium dithionate is crystallized as solid crystals by multi-effect crystallization or cooling crystallization. The solid sodium sulphate and sodium dithionate crystals are collected from solution with a centrifuge or filter (336). Heating of the sodium sulphate and sodium dithionate crystals to approximately 120° C. (330) decomposes the sodium dithionate to sodium sulphate by-product and $SO_2$ which can be recycled to the leach. The mother solution contains the remaining lithium sulphate, lithium dithionate, sodium sulphate, sodium dithionate and water is recycled (332) back to the leach to minimize water consumption and maximize lithium recovery of the overall flowsheet. Alternatively, a portion of the mother solution can be treated by nanofiltration (348) to produce clean water (350) for rinsing products and reuse of the spent rinse water (352, 354) back to the leach. The concentrate from nanofiltration (356) is recycled back to the crystallizer to maximize sodium sulphate recovery. The lithium carbonate (342) and nickel cobalt aluminum hydroxide (324) collected products are mixed to the desired ratio of lithium, nickel, cobalt and aluminum and heat treated (358) to manufacture new cathode compounds for use in lithium ion batteries. If required, additional lithium, nickel, cobalt and or aluminum compounds may be added to the collected product to achieve the desired ratio of lithium, nickel, cobalt and aluminum prior to heat treatment.

Examples illustrating the invention:

1. Lithium Cobalt Oxide Leached with Sulphur Dioxide and Sulphuric Acid (Test #LT4)

Lithium cobalt oxide consisting of the chemical formula $LiCoO_2$ (Alfa Aesar) was used for this test work. Leaching was conducted by mixing 25 grams of $LiCoO_2$ with 250 mL of 2 molar sulphuric acid. Sulphur dioxide gas was continuously sparged into the leach solution to maintain an oxidation-reduction potential (ORP) of ≤400 mV. The leach vessel consisted of a three-port round bottom flask, and stirring was conducted with a magnetic stir bar. One port of the flask was used to monitor ORP, a condenser was added to another port to condense vapours back into the vessel and the other port was used to measure temperature. The experiment was conducted without temperature control. The leaching was determined to be exothermic as the temperature rose to as high as 71° C. after 5 minutes of leaching and further cooling down to 21 C after 120 minutes of experimentation. Inductively coupled plasma spectroscopy (ICP) analysis of the solutions showed that 100% of the lithium and cobalt were extracted after 5 minutes of leaching.

2. Lithium Cobalt Oxide Leached with Metabisulphite and Sulphuric Acid (Test #LT6)

Leaching was conducted by mixing 12.5 grams of $LiCoO_2$ with 250 mL of 2 molar sulphuric acid and 0.67 molar sodium metabisulphite. The leach vessel consisted of a three-port round bottom flask, and stirring was conducted with a magnetic stir bar. One port of the flask was used to monitor ORP, a condenser was added to another port to condense vapours back into the vessel and the other port was used to measure temperature. The experiment was conducted without temperature control. The leaching was determined to be exothermic as the temperature rose to as high as 60° C. after 5 minutes of leaching and further cooling down to 25° C. after 120 minutes of experimentation. ICP analysis of the solutions showed that 100% of the lithium and cobalt were extracted after 5 minutes of leaching.

3. Precipitation of Cobalt and Lithium as Cobaltous Carbonate and Lithium Carbonate (Test #PTCL1)

A 200 mL solution containing 5.59 g/L lithium and 50.01 g/L cobalt, at pH 1.59, was prepared by leaching lithium cobalt oxide with sulphur dioxide in combination with sulphuric acid. A precipitation test was conducted by adding 31.83 grams of anhydrous sodium carbonate (which is calculated to be 1.2 times the stoichiometric amount of sodium carbonate required to precipitate all of the lithium and cobalt as carbonate). Afterwards, 10 molar sodium hydroxide was added to raise the pH to 11.14. The test was conducted in a 1000 mL beaker with an overhead stirrer. The slurry was filtered; 35.33 grams of residue and 118 mL of filtrate were collected. Evaporation was noticed. The residue was washed with saturated lithium carbonate solution, re-filtered and dried. Analysis of the residue indicated that 100% of the cobalt and 82.11% of the lithium was precipitated as a mixed cobalt and lithium carbonate.

4. Precipitation of Cobalt as Cobaltous Hydroxide (Test #PTC3-2)

A 450 mL solution containing 5.59 g/L lithium and 50.01 g/L cobalt, at pH 1.59, was prepared by leaching lithium cobalt oxide with sulphur dioxide in combination with sulphuric acid. A precipitation test was conducted by slowly adding 10 molar sodium hydroxide to raise the pH to 10.61 to precipitate cobalt. The test was conducted in a 1000 mL beaker with an overhead stirrer. The slurry was filtered; 46.48 grams of residue and 390 mL of filtrate was collected. The residue was washed with deionized water, re-filtered and dried. Analysis of the residue indicated that 100% of the cobalt was selectively precipitated as cobalt hydroxide from the solution containing lithium and cobalt. The final residue contained a trace amount of lithium (approximately 0.0292%) which could likely be further purified by additional rinsing.

5. Precipitation of Lithium as Lithium Carbonate (Test #PTL 3-2)

A 385 mL solution remaining from the filtrate after Test #PTC3-2 above was used for this test. A precipitation test was conducted by adding 25 grams of sodium carbonate monohydrate (calculated to be 1.2 times the stoichiometric amount required to precipitate all of the lithium as lithium carbonate to the solution). The test was conducted in a 1000 mL beaker with an overhead mixer. The slurry was filtered; 7.82 grams of residue and 318 mL of filtrate were collected. The residue was washed with saturated lithium carbonate solution, re-filtered and dried. Analysis of the residue indicates that 53.9% of the lithium was precipitated as lithium carbonate.

6. Dithionate Generation from Leaching Lithium Cobalt Oxide Leached with Sulphur Dioxide and Sulphuric Acid Lithium cobalt oxide consisting of the chemical formula $LiCoO_2$ (Alfa Aesar) was used for this test work. A number of leach experiments were conducted by mixing a range of 36 to 50 grams of $LiCoO_2$ with 250 mL of sulphuric acid ranging from 0.8 molar to 1.5 molar concentration. Sulphur dioxide gas was continuously sparged into the leach solution. The range of final oxidation-reduction potential (ORP) tested was between 102 mV to 401 mV. The leach vessel consisted of a three-port round bottom flask, and stirring was conducted with a magnetic stir bar. One port of the flask was used to monitor ORP, a condenser was added to another port to condense vapours back into the vessel and the other port was used to measure temperature. The experiment was conducted without temperature control. After leaching for 120 minutes samples removed for analysis of dithionate by ion chromatography. The results are summarized in Table 1.

TABLE 1

| Test Number | $S_2O_6^{2-}$ (mg/L) |
|---|---|
| LT 18 | 27150 |
| LT 19 | 30294 |
| LT 20 | 15207 |
| LT 21 | 23069 |
| LT 22 | 13290 |
| LT 23 | 30953 |
| LT 24 | 19951 |
| LT 25 | 9260 |
| LT 26 | 10386 |

7. Locked Cycling Testing for Treating Lithium Cobalt Oxide

Lithium cobalt oxide consisting of the chemical formula $LiCoO_2$ (Alfa Aesar) was used for this test work. Lithium cobalt oxide was processed in a locked cycle manner to simulate the major unit operations in the flowsheet described in embodiment two. The locked cycle testing demonstrates the removal of sulphate and dithionate from the circuit which enables un-recovered lithium and water at the end of the flowsheet from the previous cycle to be recirculated to the front end of the flowsheet of the subsequent cycle to be recovered.

The leaching condition consists of pH control to approximately 1.5; 1.2M $H_2SO_4$ in the leaching head; 8% pulp density; and $SO_2$ sparing with a target ORP of 350 mV. For each leaching stage within 4 cycles, all the head solids visually disappeared after 2 hours of $SO_2$ reductive leaching.

Leachate from previous leaching stage is adjusted to pH 11 by 10M NaOH to precipitate the dissolved cobalt as $Co(OH)_2$. 2 re-pulp wash steps and filtration was then followed. The wet solids were dried at 60° C.

Filtrate from the previous step was then mixed with 1.2 times stoichiometric $Na_2CO_3$ with respect to lithium concentration measured by ICP. The mixed solution was then heated to 95° C. for 30 minutes before filtering out the $Li_2CO_3$ precipitate. The precipitate was washed with saturated $Li_2CO_3$ at 95° C. Except for Lock Cycle #1, all saturated $Li_2CO_3$ wash solutions were prepared by $Li_2CO_3$ solids generated from previous cycle. In the locked cycle, lithium is expected to accumulate in solution result in increasing Li recovery. Results from ICP and calculation confirmed this conclusion. Calculated lithium recovery for each cycle of the flowsheet is shown in Table 2.

TABLE 2

| Lock Cycle No. | % Lithium Recovery |
|---|---|
| 1 | 32% |
| 2 | 36% |
| 3 | 68% |
| 4 | 76% |

Filtrate from the previous step containing a mixture of sodium sulphate, sodium dithionate and un-recovered lithium ion solution is cooled to 5° C. to for 2 hours with gentle mixing with an overhead mixer to crystallize sodium sulphate decahydrate and sodium dithionate dihydrate. The crystals were collected by filtration and dried at 60° C. to collect anhydrous crystals. The weight of the dry crystals for Cycles 1 to 4 is shown in Table 3.

TABLE 3

| Lock Cycle No. | Weight of Dry Crystals (g) |
|---|---|
| 1 | 26.16 |
| 2 | 59.77 |
| 3 | 78.50 |
| 4 | 74.25 |

An Example of a nanofiltration step is described in Example 20.

8. Lithium Nickel Manganese Cobalt Oxide Leached with Sulphur Dioxide and Sulphuric Acid (Test #NMC3-5)

Lithium nickel manganese cobalt oxide consisting of the chemical formula $LiNi_{0.33}Mn_{0.33}Co_{0.33}O_2$ (Sigma Aldrich) was used for this test work. Leaching was conducted by mixing 30 grams of $LiNi_{0.33}Mn_{0.33}Co_{0.33}O_2$ with 255 mL of 1.2 molar sulphuric acid. Sulphur dioxide gas was continuously sparged into the leach solution to maintain an oxidation-reduction potential (ORP) of =550 mV. The leach vessel consisted of a three-port round bottom flask, and stirring was conducted with a magnetic stir bar. One port of the flask was used to monitor ORP, a condenser was added to another port to condense vapours back into the vessel and the other port was used to measure temperature. The experiment was conducted without temperature control. The leaching was determined to be exothermic as the temperature rose to as high as 66° C. after 30 minutes of leaching and further cooling down to 28 C after 120 minutes of experimentation. Inductively coupled plasma spectroscopy (ICP) analysis of the solutions showed that 100% of the lithium, nickel, manganese and cobalt were extracted after 120 minutes of leaching. Ion Chromatography analysis showed that the final leach solution contained 24.1 g/L dithionate.

9. Precipitation of Nickel, Manganese and Cobalt as (Ni, Mn,Co)$(OH)_2$ with NaOH (Test #NMC-2-PTC 11)

A 200 mL solution containing 7.71 g/L lithium, 19.83 g/L nickel, 18.09 g/L manganese and 19.38 g/L cobalt, at pH 0.8, was prepared by leaching lithium nickel manganese cobalt oxide with sulphur dioxide in combination with sulphuric acid. A precipitation test was conducted by slowly adding 10 molar sodium hydroxide to raise the pH to 10.70 to precipitate nickel, manganese and cobalt. The test was conducted in a 500 mL beaker with a magnetic stirrer. The slurry was filtered. 18.70 grams of dry residue and 140 mL of filtrate was collected. The residue was washed with deionized water, re-filtered and dried. Analysis of the residue indicated that 100% nickel, 100% manganese and 100% of the cobalt were precipitated as metal hydroxide from the solution containing lithium, nickel, manganese and cobalt. The final residue contained a small amount of lithium (approximately 0.155%) which could likely be further purified by additional rinsing.

10. Precipitation of Lithium as Lithium Carbonate Following Hydroxide Precipitation of Nickel, Manganese and Cobalt with NaOH (Test #NMC-2-PTL 11)

The remnants from the filtrate after Test #NMC-2-PTC-11 were used for this test. A precipitation test was conducted by adding 14.12 grams of sodium carbonate (calculated to be 1.2 times the stoichiometric amount required to precipitate all of the lithium as lithium carbonate to the solution). The test was conducted in a 500 mL beaker with a magnetic stirrer at 95° C. for 15 minutes. The slurry was filtered; 2.39 grams of dry residue and 130 mL of filtrate were collected. The residue was washed with saturated lithium carbonate solution, re-filtered and dried. Analysis of the residue indicates that 34.6% of the lithium was precipitated as lithium carbonate.

11. Precipitation of Nickel, Manganese and Cobalt as (Ni, Mn,Co)(OH)$_2$ with LiOH (Test #NMC-2-CT-PTC 3)

A 200 mL solution containing 7.30 g/L lithium, 18.27 g/L nickel, 17.05 g/L manganese and 18.24 g/L cobalt, at pH 0.66, was prepared by leaching lithium nickel manganese cobalt oxide with sulphur dioxide in combination with sulphuric acid. A precipitation test was conducted by slowly adding 3.34 molar lithium hydroxide to raise the pH to 11.07 to precipitate nickel, manganese and cobalt. The test was conducted in a 500 mL beaker with a magnetic stirrer. The slurry was filtered; 18.24 grams of residue and 206 mL of filtrate was collected. The residue was washed with deionized water, re-filtered and dried. Analysis of the residue indicated that 100% nickel, 100% manganese and 100% of the cobalt were precipitated as metal hydroxide from the solution containing lithium, nickel, manganese and cobalt. The final residue contained a small amount of lithium (approximately 0.787%) which could likely be further purified by additional rinsing.

12. Precipitation of Lithium as Lithium Carbonate Following Hydroxide Precipitation of Nickel, Manganese and Cobalt with LiOH (Test #NMC-2-CT-PTL 3)

The remnants from the filtrate after Test #NMC-2-CT-PTC3 were used for this test. A precipitation test was conducted by adding 27.74 grams of sodium carbonate (calculated to be 1.2 times the stoichiometric amount required to precipitate all of the lithium as carbonate to the solution). The test was conducted in a 500 mL beaker with a magnetic stirrer at 95° C. for 15 minutes. The slurry was filtered; 12.12 grams of dry residue and 184 mL of filtrate were collected. The residue was washed with saturated lithium carbonate solution, re-filtered and dried. Analysis of the residue indicates that 49.8% of the lithium was precipitated as lithium carbonate.

13. Locked Cycling Testing for Treating Lithium Nickel Manganese Cobalt Oxide Lithium Nickel Manganese Cobalt Oxide Consisting of the Chemical Formula LiNi$_{0.33}$Mn$_{0.33}$Co$_{0.33}$O$_2$ (Sigma Aldrich) was used for this test work. Lithium nickel manganese cobalt oxide was processed in a locked cycle manner to simulate the major unit operations in the flowsheet described in embodiment three. The locked cycle testing demonstrates the removal of sulphate and dithionate from the circuit which enables un-recovered lithium and water at the end of the flowsheet from the previous cycle to be recirculated to the front end of the flowsheet of the subsequent cycle to be recovered.

The leaching condition consists treating 100 g of sample with pH control to approximately 1.5; 1.5M H$_2$SO$_4$ in the leaching head; 10% pulp density; and SO$_2$ sparing with a target ORP of 550 mV. For each leaching stage within 4 cycles, the head solids visually disappeared after 2 hours of SO$_2$ reductive leaching.

Leachate from previous leaching stage is adjusted to pH 11 by saturated LiOH to precipitate the dissolved nickel, manganese and cobalt as (Ni,Mn,Co)(OH)$_2$. Two re-pulp wash steps and filtration then followed. The wet solids were dried at 60° C.

Filtrate from the previous step was then mixed with 1.0 times stoichiometric Na$_2$CO$_3$ with respect to lithium concentration measured by ICP. The mixed solution was then headed to 95° C. for 30 minutes before filtering out the Li$_2$CO$_3$ precipitate. The precipitate was washed with saturated Li$_2$CO$_3$ at 95° C. Except for Lock Cycle #1, all saturated Li$_2$CO$_3$ wash solutions were prepared by Li$_2$CO$_3$ solids generated from previous cycle. In the locked cycle, lithium is expected to accumulate in solution result in increasing Li recovery. Results from ICP and calculation confirmed this conclusion. Calculated lithium recovery for each cycle of the flowsheet are shown in Table 4.

TABLE 4

| Lock Cycle No. | % Lithium Recovery |
|---|---|
| 1 | 47% |
| 2 | 67% |
| 3 | 78% |
| 4 | 100% |

Filtrate from the previous step containing a mixture of sodium sulphate, sodium dithionate and un-recovered lithium ion solution was cooled to 5° C. to for 2 hours with gentle mixing using an overhead mixer to crystallize sodium sulphate decahydrate and sodium dithionate dihydrate. The crystals were collected by filtration and dried as 60° C. to collect anhydrous crystals. The weights of the dry crystals for Cycles 1 to 4 are shown in Table 5.

TABLE 5

| Lock Cycle No. | Weight of Dry Crystals (g) |
|---|---|
| 1 | 53.22 |
| 2 | 108.29 |
| 3 | 71.75 |
| 4 | 236.11 |

An Example of a nanofiltration step is described in Example 20.

14. Lithium Nickel Cobalt Aluminum Oxide Leached with Sulphur Dioxide and Sulphuric Acid (Test #NCA-LT8)

Lithium nickel cobalt aluminum oxide consisting of the chemical formula LiNi$_{0.08}$Co$_{0.5}$Al$_{0.05}$O$_2$ (MTI Corp) was used for this test work. Leaching was conducted by mixing 30 grams of LiNi$_{0.8}$Co$_{0.15}$Al$_{0.05}$O$_2$ with 245 mL of 1.2 molar sulphuric acid. Sulphur dioxide gas was continuously sparged into the leach solution to maintain an oxidation-reduction potential (ORP) of =550 mV. The leach vessel consisted of a four-port glass reactor, and stirring was conducted with an overhead mixer. One port of the flask was used to monitor ORP, a condenser was added to another port to condense vapours back into the vessel, the other port was used to measure temperature and the final port for the overhead mixer. The experiment was conducted without temperature control. The leaching was determined to be exothermic as the temperature rose to as high as 88° C. after 30 minutes of leaching and further cooling down to 50° C. after 120 minutes of experimentation. Inductively coupled plasma spectroscopy (ICP) analysis of the solutions showed that 100% of the lithium, nickel, cobalt and aluminum were extracted after 120 minutes of leaching. Ion Chromatography analysis showed that the final leach solution contained 11.3 g/L dithionate.

15. Precipitation of Nickel, Cobalt and Aluminum as (Ni, Co,Al)(OH)$_2$ with NaOH (Test #NCA-PTC 1)

A 200 mL solution containing 8.63 g/L lithium, 57.82 g/L nickel, 10.54 g/L cobalt and 1.17 g/L aluminum, at pH 1.06, was prepared by leaching lithium nickel cobalt aluminum oxide with sulphur dioxide in combination with sulphuric acid. A precipitation test was conducted by slowly adding 10 molar sodium hydroxide to raise the pH to 11.09 to precipitate nickel, cobalt and aluminum. The test was conducted in a 500 mL beaker with a magnetic stirrer. The slurry was filtered. 27.15 grams of dry residue and 135 mL of filtrate was collected. The residue was washed with deionized water, re-filtered and dried. Analysis of the residue indicated that 100% nickel, 100% manganese and 100% of the cobalt were precipitated as metal hydroxide from the solution containing lithium, nickel, manganese and cobalt. The final residue contained a small amount of lithium (approximately 0.078%) which could likely be further purified by additional rinsing.

16. Precipitation of Lithium as Lithium Carbonate Following Hydroxide Precipitation of Nickel, Cobalt and Aluminum with NaOH (Test #NCA-PTL 1)

The remnants from the filtrate after Test #NCA-PTL 1 were used for this test. A precipitation test was conducted by adding 15.82 grams of sodium carbonate (calculated to be 1.2 times the stoichiometric amount required to precipitate all of the lithium as carbonate to the solution). The test was conducted in a 500 mL beaker with a magnetic stirrer at 95° C. for 15 minutes. The slurry was filtered; 2.88 grams of dry residue and 125 mL of filtrate were collected. The residue was washed with saturated lithium carbonate solution, re-filtered and dried. Analysis of the residue indicated that 31.5% of the lithium was precipitated as lithium carbonate.

17. Precipitation of Nickel, Cobalt and Aluminum as (Ni, Co,Al)(OH)$_2$ with LiOH (Test #NCA-CT-PTC 2)

A 200 mL solution containing 6.64 g/L lithium, 46.84 g/L nickel, 8.45 g/L cobalt and 0.89 g/L aluminum, at pH 0.35, was prepared by leaching lithium nickel cobalt aluminum oxide with sulphur dioxide in combination with sulphuric acid. A precipitation test was conducted by slowly adding 4.44 molar lithium hydroxide to raise the pH to 11.03 to precipitate nickel, cobalt and aluminum. The test was conducted in a 500 mL beaker with a magnetic stirrer. The slurry was filtered; 18.55 grams of residue and 202 mL of filtrate was collected. The residue was washed with deionized water, re-filtered and dried. Analysis of the residue indicated that 100% nickel, 100% cobalt and 100% of the aluminum were precipitated as metal hydroxide from the solution containing lithium, nickel, cobalt and aluminum. The final residue contained a small amount of lithium (approximately 0.648%) which could likely be further purified by additional rinsing.

18. Precipitation of Lithium as Lithium Carbonate Following Hydroxide Precipitation of Nickel, Cobalt and Aluminum with LiOH (Test #NCA-CT-PTL 2)

The remnants from the filtrate after Test #NCA-CT-PTC 2 were used for this test. A precipitation test was conducted by adding 27.31 grams of sodium carbonate (calculated to be 1.0 times the stoichiometric amount required to precipitate all of the lithium as carbonate to the solution). The test was conducted in a 500 mL beaker with a magnetic stirrer at 95° C. for 15 minutes. The slurry was filtered; 14.04 grams of dry residue and 185 mL of filtrate was collected. The residue was washed with saturated lithium carbonate solution, re-filtered and dried. Analysis of the residue indicates that 55.97% of the lithium was precipitated as lithium carbonate.

19. Locked Cycling Testing for Treating Lithium Nickel Cobalt Aluminum Oxide

Lithium nickel cobalt aluminum oxide consisting of the chemical formula LiNi$_{0.8}$Co$_{0.15}$Al$_{0.05}$O$_2$ (MTI Corp) was used for this test work. Lithium nickel cobalt aluminum oxide was processed in a locked cycle manner to simulate the major unit operations in the flowsheet described in embodiment three. The locked cycle testing demonstrates the removal of sulphate and dithionate from the circuit which enables un-recovered lithium and water at the end of the flowsheet from the previous cycle to be recirculated to the front end of the flowsheet of the subsequent cycle to be recovered.

Leaching consisted of treating 400 g of sample with pH control to approximately 1.5; 1.2M H$_2$SO$_4$ in the leaching head; 10% pulp density; and SO$_2$ sparing with a target ORP of 550 mV. For each leaching stage within 7 cycles, the head solids visually disappeared after 2 hours of SO$_2$ reductive leaching.

Leachate from previous leaching stage was adjusted to pH 10.5 by saturated LiOH to precipitate the dissolved nickel, cobalt and aluminum as (Ni,Co,Al)(OH)$_2$. Two re-pulp wash steps and filtration then followed. The wet solids were dried at 60° C.

Filtrate from the previous step was then mixed with 1.2 times stoichiometric Na$_2$CO$_3$ with respect to lithium concentration measured by ICP. The mixed solution was then heated to 95° C. for 30 minutes before filtering out the Li$_2$CO$_3$ precipitate. The precipitate was washed with saturated Li$_2$CO$_3$ at 95° C. With the exception of Lock Cycle #1, all saturated Li$_2$CO$_3$ wash solutions were prepared by Li$_2$CO$_3$ solids generated from previous cycle. In the locked cycle, Lithium was expected to accumulate in solution result in increased Li recovery. Results from ICP and calculation confirmed this conclusion. Calculated lithium recovery for each cycle of the flowsheet are shown in Table 6.

TABLE 6

| Lock Cycle No. | % Lithium Recovery |
| --- | --- |
| 1 | 51% |
| 2 | 62% |
| 3 | 69% |
| 4 | 70% |
| 5 | 80% |
| 6 | 86% |
| 7 | 100% |

Filtrate from the previous step containing a mixture of sodium sulphate, sodium dithionate and un-recovered lithium ion solution was cooled to 5° C. to for 2 hours with gentle mixing with an overhead mixer to crystallize sodium sulphate decahydrate and sodium dithionate dihydrate. The crystals were collected by filtration and dried as 60° C. to collect anhydrous crystals. The weights of the dry crystals for Cycles 1 to 4 are shown in Table 7.

TABLE 7

| Lock Cycle No. | Weight of Dry Crystals (g) |
| --- | --- |
| 1 | 67.9 |
| 2 | 185.3 |
| 3 | 161.4 |
| 4 | 175.0 |
| 5 | 218.7 |
| 6 | 109.3 |
| 7 | 205.6 |

An Example of a nanofiltration step is described in Example 20.

20. Nanofiltration

A nanofiltration test was conducted by pumping a feed solution containing 32.23 g/L sulphate and 24.0 dithionate through a Dow Filmtec NF270-400 nanofiltration membrane. The feed flow rate was set at 5.65 L/min. The pressure at the inlet of the membrane was measured at 29.1 Bar. The pressure at the concentrate outlet was measured at 28.5 Bar.

The permeate flowrate through the membrane was measured at 0.65 L/min. A sample of the permeate was collected and sulphate was measured as 2.30 g/L and dithionate as 2.84 g/L by ion chromatography. The concentrate flow rate was calculated as 5.0 L/min. The concentrate was calculated to contain 36.13 g/L sulphate and 26.80 g/L dithionate. The sulphate rejection was calculated to be 92.2% and the dithionate rejection was calculated to be 85.5%.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A process of water removal and/or recycling from sodium sulphate and sodium dithionate containing liquor derived from processing cobalt resource material essentially free of lithium, comprising the steps of:
   a. precipitation of cobalt as cobaltous carbonate in whole or in part followed by its removal in whole or in part from the liquor by centrifugation or filtration;
   b. crystallization of sodium sulphate and sodium dithionate to separate the majority of sodium sulphate and sodium dithionate from the liquor;
   c. heating of the sodium sulphate and sodium dithionate crystals to form anhydrous sodium sulphate, sulphur dioxide and water; and
   d. separation of anhydrous sodium sulphate from the sulfur dioxide and water.

2. The process of claim 1, wherein cobaltous carbonate is precipitated by adding sodium carbonate to a solution containing cobalt sulfate and cobalt dithionate.

3. The process of claim 2 in which sodium carbonate is in aqueous solution.

4. The process of claim 1, wherein sulphate and dithionate are derived from sulphur dioxide, sulphurous acid, metabisulphite, bisulphate with or without sulphuric acid.

5. The process of claim 1, wherein nanofiltration of liquor separates water from sodium dithionate and sodium sulfate.

6. The process of claim 1, including the step of recycling of sodium dithionate and sodium sulphate.

7. The process of claim 1, including the presence of manganese in the process.

8. The process of claim 7, in which manganese is recovered by co-precipitation as manganese carbonate in combination with cobaltous carbonate followed by its removal in whole or in part from the liquor by filtration.

9. The process of claim 1, including the presence of nickel in the process.

10. The process of claim 9, wherein nickel is recovered by co-precipitation as nickel carbonate in combination with cobaltous carbonate followed by its removal in whole or in part from the liquor by filtration.

11. The process of claim 1, including the presence of aluminum in the process.

12. The process of claim 11, wherein aluminum is recovered by co-precipitation as aluminum carbonate in combination with cobaltous carbonate followed by its removal in whole or in part from the liquor by filtration.

13. The process of claim 1 wherein the cobalt resource material is cobalt containing ore.

14. A process of water removal and/or recycling from sodium sulphate and sodium dithionate containing liquor derived from processing cobalt resource material containing lithium, comprising the steps of:
   a. precipitation of cobalt as cobaltous carbonate in whole or in part and lithium in whole or in part as lithium carbonate followed by their removal in whole or in part from the liquor by centrifugation or filtration;
   b. crystallization of sodium sulphate and sodium dithionate to separate the majority of sodium sulphate and sodium dithionate from the liquor;
   c. heating of the sodium sulphate and sodium dithionate crystals to form anhydrous sodium sulphate, sulfur dioxide and water; and
   d. separation of anhydrous sodium sulphate from the sulfur dioxide and water.

15. The process of claim 14 wherein cobaltous carbonate is precipitated by adding sodium carbonate to a solution containing cobalt sulfate and cobalt dithionate.

16. The process of claim 14, wherein sulphate and dithionate are derived from sulphur dioxide, sulphurous acid, metabisulphite, bisulphate with or without sulphuric acid.

17. The process of claim 14, wherein nanofiltration of liquor separates water from sodium dithionate and sodium sulfate.

18. The process of claim 14, including the step of recycling of sodium dithionate and sodium sulphate.

19. The process of claim 14, including the presence of manganese in the process.

20. The process of claim 19, in which manganese is recovered by co-precipitation as manganese carbonate in combination with cobaltous carbonate and lithium carbonate followed by its removal in whole or in part from the liquor by filtration.

21. The process of claim 14, including the presence of nickel in the process.

22. The process of claim 21, wherein nickel is recovered by co-precipitation as nickel carbonate in combination with cobaltous carbonate and lithium carbonate followed by its removal in whole or in part from the liquor by filtration.

23. The process of claim 14, including the presence of aluminum in the process.

24. The process of claim 23, wherein aluminum is recovered by co-precipitation as aluminum carbonate in combination with cobaltous carbonate and lithium carbonate followed by its removal in whole or in part from the liquor by filtration.

25. The process of claim 14 wherein the cobalt resource material contains lithium ion battery cathode material.

26. A process of water removal and/or recycling from sodium sulphate and sodium dithionate containing liquor derived from processing cobalt resource material essentially free of lithium, comprising the steps of:
   a. precipitation of cobalt as cobaltous hydroxide in whole or in part followed by its removal in whole or in part from the liquor by centrifugation or filtration;
   b. crystallization of sodium sulphate and sodium dithionate to separate the majority of sodium sulphate and sodium dithionate from the liquor;
   c. heating of the sodium sulphate and sodium dithionate crystals to form anhydrous sodium sulphate, sulphur dioxide and water; and
   d. separation of anhydrous sodium sulphate from the sulphur dioxide and water.

27. The process of claim 26 wherein cobaltous hydroxide is precipitated by adding sodium hydroxide to a solution containing cobalt sulfate and cobalt dithionate.

28. The process of claim 27 in which sodium hydroxide is in aqueous solution.

29. The process of claim 26, wherein sulphate and dithionate are derived from sulphur dioxide, sulphurous acid, metabisulphite, bisulphate with or without sulphuric acid.

30. The process of claim 26, wherein nanofiltration of liquor separates water from sodium dithionate and sodium sulfate.

31. The process of claim 26, including the step of recycling of sodium dithionate and sodium sulphate.

32. The process of claim 26, including the presence of manganese in the process.

33. The process of claim 32, in which manganese is recovered by co-precipitation as manganese hydroxide in combination with cobaltous hydroxide followed by its removal in whole or in part from the liquor by filtration.

34. The process of claim 26, including the presence of nickel in the process.

35. The process of claim 34, wherein nickel is recovered by co-precipitation as nickel hydroxide in combination with cobaltous hydroxide followed by its removal in whole or in part from the liquor by filtration.

36. The process of claim 26, including the presence of aluminum in the process.

37. The process of claim 36, wherein aluminum is recovered by co-precipitation as aluminum hydroxide in combination with cobaltous carbonate followed by its removal in whole or in part from the liquor by filtration.

38. The process of claim 26, wherein the cobalt resource material is cobalt containing ore.

39. A process of water removal and/or recycling from sodium sulphate and sodium dithionate containing liquor derived from processing cobalt resource material containing lithium, comprising the steps of:
   a. precipitation of cobalt as cobaltous hydroxide in whole or in part followed by its removal in whole or in part from the liquor by centrifugation or filtration;
   precipitation of lithium as lithium carbonate in whole or in part from the cobaltous hydroxide removed liquor of a, followed by its removal in whole or in part from the liquor by centrifugation or filtration;
   b. crystallization of sodium sulphate and sodium dithionate to separate the majority of sodium sulphate and sodium dithionate from the liquor;
   c. heating of the sodium sulphate and sodium dithionate crystals to form anhydrous sodium sulphate, sulphur dioxide and water; and
   d. separation of anhydrous sodium sulphate from sulphur dioxide and water.

40. The process of claim 39 wherein cobaltous hydroxide is precipitated by adding sodium hydroxide to a solution containing cobalt sulfate and cobalt dithionate.

41. The process of claim 39, wherein sulphate and dithionate are derived from sulphur dioxide, sulphurous acid, metabisulphite, bisulphate with or without sulphuric acid.

42. The process of claim 39, wherein nanofiltration separates water from sodium dithionate and sodium sulfate.

43. The process of claim 39, including the step of recycling of sodium dithionate and sodium sulphate.

44. The process of claim 39, including the presence of manganese in the process.

45. The process of claim 44, in which manganese is recovered by co-precipitation as manganese hydroxide in combination with cobaltous hydroxide followed by its removal in whole or in part from the liquor by filtration.

46. The process of claim 39, including the presence of nickel in the process.

47. The process of claim 46, wherein nickel is recovered by co-precipitation as nickel hydroxide in combination with cobaltous hydroxide followed by its removal in whole or in part from the liquor by filtration.

48. The process of claim 39, including the presence of aluminum in the process.

49. The process of claim 48, wherein aluminum is recovered by co-precipitation as aluminum hydroxide in combination with cobaltous hydroxide followed by its removal in whole or in part from the liquor by filtration.

50. The process of claim 39 wherein the cobalt resource material contains lithium ion battery cathode material.

* * * * *